United States Patent
Naya

(10) Patent No.: US 9,753,548 B2
(45) Date of Patent: Sep. 5, 2017

(54) IMAGE DISPLAY APPARATUS, CONTROL METHOD OF IMAGE DISPLAY APPARATUS, AND PROGRAM

(71) Applicant: CANON KABUSHIKI KAISHA, Tokyo (JP)

(72) Inventor: Yuji Naya, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 14/813,425

(22) Filed: Jul. 30, 2015

(65) Prior Publication Data

US 2016/0041621 A1  Feb. 11, 2016

(30) Foreign Application Priority Data

Aug. 7, 2014  (JP) ................................. 2014-161697

(51) Int. Cl.

| | |
|---|---|
| *G06F 3/01* | (2006.01) |
| *G06F 3/0481* | (2013.01) |
| *G06F 3/0484* | (2013.01) |
| *G06F 3/0488* | (2013.01) |
| *H04N 9/31* | (2006.01) |

(52) U.S. Cl.
CPC ............ *G06F 3/017* (2013.01); *G06F 3/0481* (2013.01); *G06F 3/04842* (2013.01); *G06F 3/04845* (2013.01); *G06F 3/04883* (2013.01); *H04N 9/31* (2013.01); *H04N 9/3179* (2013.01)

(58) Field of Classification Search
CPC .... G06F 3/017; G06F 3/0481; G06F 3/04812; G06F 3/04842; G06F 3/04845; G06F 3/0488; G06F 3/04883; G06F 3/04886; G06F 17/241; H04N 9/31; H04N 9/3179
See application file for complete search history.

(56) References Cited

U.S. PATENT DOCUMENTS

| | | | |
|---|---|---|---|
| 7,142,196 B1* | 11/2006 | Connor ................ | G09B 29/106 345/173 |
| 2006/0001645 A1* | 1/2006 | Drucker .................. | G06F 3/017 345/156 |
| 2008/0170752 A1* | 7/2008 | Murayama .............. | A63F 13/10 382/103 |
| 2008/0229256 A1* | 9/2008 | Shibaike ................ | G06F 3/0488 715/863 |
| 2010/0011282 A1* | 1/2010 | Dollard ................. | G06F 17/241 715/233 |
| 2010/0058166 A1* | 3/2010 | Chikyu ................. | G06F 17/241 715/230 |
| 2011/0288854 A1* | 11/2011 | Glass .................... | G06F 3/0482 704/9 |

(Continued)

FOREIGN PATENT DOCUMENTS

JP        2014-004783 A        1/2014

*Primary Examiner* — Tom Sheng
(74) *Attorney, Agent, or Firm* — Fitzpatrick, Cella, Harper & Scinto

(57) ABSTRACT

An image display apparatus displays image data including a plurality of objects. The image display apparatus includes a display unit configured to focus-display an object from among the plurality of objects; an input unit configured to input annotation to the object; and a change unit configured to change a display of the annotation depending on the focus-displayed object if an object different from the object corresponding to the annotation that has been input by the input unit is focus-displayed.

7 Claims, 23 Drawing Sheets

(56) References Cited

U.S. PATENT DOCUMENTS

| | | | | |
|---|---|---|---|---|
| 2012/0110509 A1* | 5/2012 | Isozu | ................... | G06F 3/0482 |
| | | | | 715/830 |
| 2013/0215148 A1* | 8/2013 | Antonyuk | ............. | G06T 19/006 |
| | | | | 345/633 |
| 2015/0346966 A1* | 12/2015 | Horiuchi | ............... | G06F 3/0484 |
| | | | | 715/781 |
| 2016/0018887 A1* | 1/2016 | Tsukahara | ............. | G06F 1/1694 |
| | | | | 345/8 |

* cited by examiner

FIG. 6

Block information

| | Attribute | Coordinate-X | Coordinate-Y | Width W | Height H | OCR information |
|---|---|---|---|---|---|---|
| Block 1 | 1 | X1 | Y1 | W1 | H1 | Presence |
| Block 2 | 3 | X2 | Y2 | W2 | H2 | Presence |
| Block 3 | 2 | X3 | Y3 | W3 | H3 | Absence |
| Block 4 | 1 | X4 | Y4 | W4 | H4 | Presence |
| Block 5 | 3 | X5 | Y5 | W5 | H5 | Presence |
| Block 6 | 2 | X6 | Y6 | W6 | H6 | Absence |

* Attribute 1: Character, 2: Photograph, 3: Graphic

Input file information

| Total number of blocks | N (=6) |
|---|---|

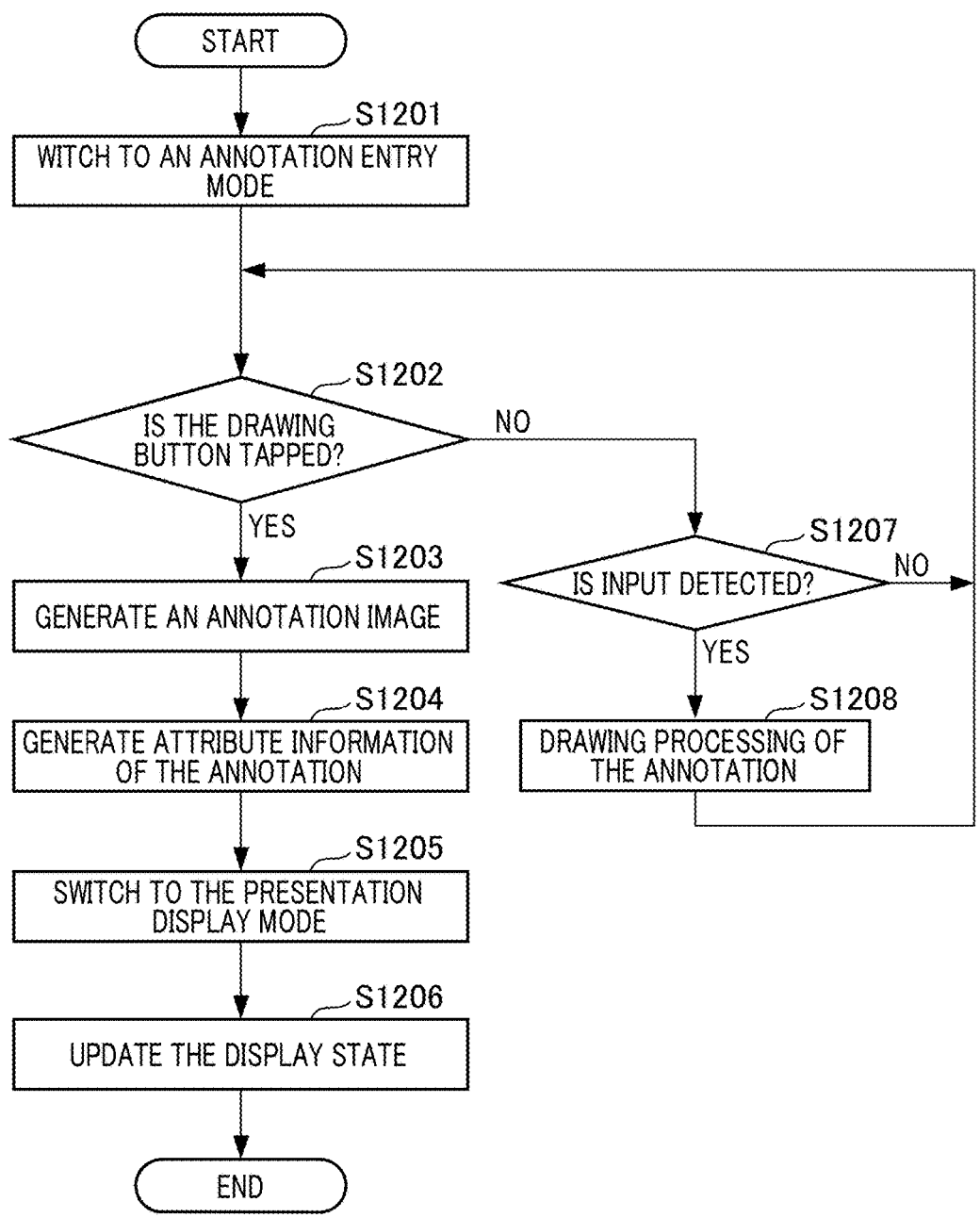

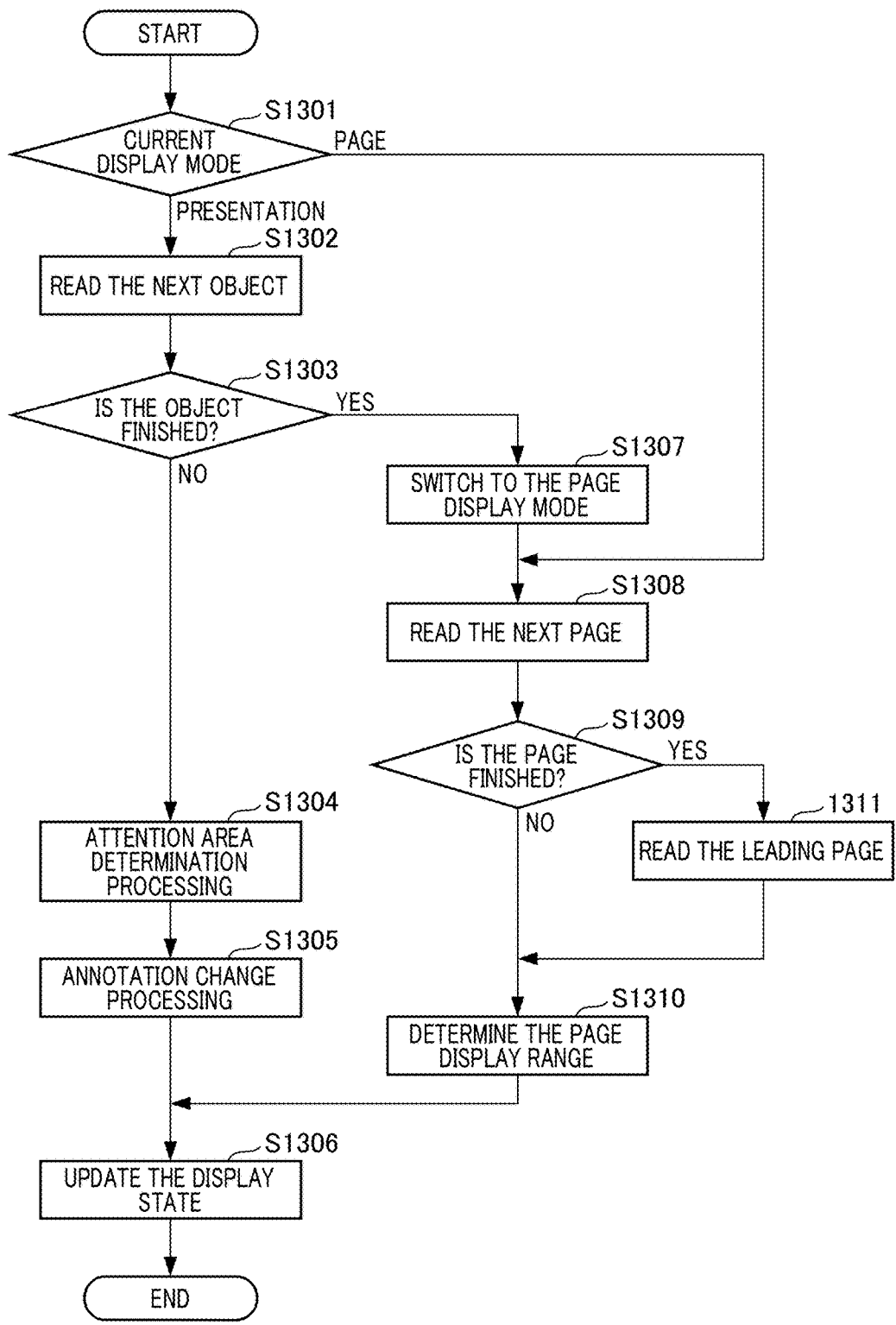

FIG. 15A

| Object ID | Page | Attention state flag | Already displayed flag |
|---|---|---|---|
| 01 | 01 | 1 | 1 |
| 02 | 01 | 0 | 0 |
| 03 | 01 | 0 | 0 |
| 04 | 01 | 0 | 0 |

FIG. 15B

| Object ID | Page | Attention state flag | Already displayed flag |
|---|---|---|---|
| 01 | 01 | 0 | 1 |
| 02 | 01 | 1 | 1 |
| 03 | 01 | 0 | 0 |
| 04 | 01 | 0 | 0 |

FIG. 15C

| Object ID | Page | Attention state flag | Already displayed flag |
|---|---|---|---|
| 01 | 01 | 1 | 1 |
| 02 | 01 | 0 | 1 |
| 03 | 01 | 0 | 0 |
| 04 | 01 | 0 | 0 |

FIG. 16A

| Annotation ID | Page | Corresponding object ID | Transmittance [%] |
|---|---|---|---|
| 01 | 01 | 01 | 0 |

FIG. 16B

| Annotation ID | Page | Corresponding object ID | Transmittance [%] |
|---|---|---|---|
| 01 | 01 | 01 | 95 |

FIG. 21A

| Display order | Page | Object ID | Annotation ID |
|---|---|---|---|
| 01 | 01 | 01 | − |
| 02 | 01 | 02 | − |
| 03 | 01 | 03 | − |
| 04 | 01 | 04 | − |

FIG. 21B

| Display order | Page | Object ID | Annotation ID |
|---|---|---|---|
| 01 | 01 | 01 | − |
| 02 | 01 | 02 | − |
| 03 | 01 | 03 | − |
| 04 | 01 | − | 01 |
| 05 | 01 | 04 | − |

IMAGE DISPLAY APPARATUS, CONTROL METHOD OF IMAGE DISPLAY APPARATUS, AND PROGRAM

BACKGROUND OF THE INVENTION

Field of the Invention

The present invention relates to an image display apparatus, a control method of an image display apparatus, and a program, and specifically relates to an image display apparatus and an image display method that are suitable for browsing structured image data with other viewers by sharing a screen.

Description of the Related Art

There is a technique in which image data is displayed by using such as a projector or an electronic blackboard, and data that is input by handwriting in real time (referred to as "annotation data", or simply "annotation") is displayed superimposed on this displayed image data. Japanese Patent Laid-Open No. 2014-004783 discloses a technique of increasing a transmittance of the annotation with the increase of the elapsed time after the annotation is input if the annotation is displayed superimposed on the image data displayed on the screen such as the electronic blackboard. Accordingly, old annotations gradually fade in accordance with the elapsed time, and if new annotations and the old annotation are overlapped, a viewer of the screen can easily focus on the new annotations.

However, image data that successively changes its display is included in the image data. As an example of the image data that successively changes its display, there is a page in which "animation in presentation application" is set. A plurality of objects included in such a page are focused in order according to a user's operation, and displayed on the screen. Additionally, as another example of the image data that successively changes its display, there is also image data in which an object specified by the user is focused on and displayed on the screen, among the plurality of objects included in the page.

In addition, the following methods serve as examples of the focus-display: a method for displaying an object at a display magnification corresponding to a size of the object to which attention is to be paid; a method for displaying the object to which attention is to be paid with highlights and displaying other objects in grayout; and a method for visibly displaying the object to which attention is to be paid that has been hidden (has been invisible).

Here, it is contemplated that the annotation is entered for the supplemental explanation of the object if an object among the plurality of objects included in the page is being focus-displayed. Such kind of annotation is desirably displayed during the focus-display of the object that is a target of the supplemental explanation. However, in the Japanese Patent Laid-Open No. 2014-004783, even such a kind of annotation may gradually fade in accordance with the elapsed time. Additionally, if the annotation is entered while changing the area to be displayed with attention (the area to be focus-displayed), there are cases in which the annotations are displayed superimposed on the area to which attention is to be paid, or the viewer will pay attention to an area different from the area where a presenter wants the viewer to pay attention.

SUMMARY OF THE INVENTION

The present invention provides an image display apparatus such that only an annotation that is necessary for an area to which attention is to be paid is displayed if the annotation is entered while changing the area to be displayed is the focus of attention (focus-display).

According to an embodiment of the present invention, an image display apparatus that displays image data including a plurality of objects is provided that includes a display unit configured to focus-display an object from among the plurality of objects; an input unit configured to input annotation to the object; and a change unit configured to change a display of the annotation depending on the focus-displayed object if an object different from the object corresponding to the annotation that has been input by the input unit is focus-displayed.

According to the present invention, if the annotation is entered while changing the area to be displayed is the focus of attention (focus display), the image display apparatus that displays only the annotation that is necessary for the area to which attention is to be paid can be provided. Hence, it is possible to prevent the annotations from displayed while overlapping in the area to be paid attention, and to prevent the viewer's attention from turning to an area that is different from the area to which a presenter wants the viewer to pay attention.

Further features of the present invention will become apparent from the following description of exemplary embodiments (with reference to the attached drawings).

BRIEF DESCRIPTION OF THE DRAWINGS

FIG. 6 is a table illustrating block information of each attribute and input file information.

FIG. 13 is a flowchart illustrating processes of annotation generation.

FIG. 14 is a flowchart illustrating next selection processing.

FIGS. 15A to 15C are tables illustrating the display states of the object.

FIGS. 16A and 16B are tables illustrating attribute information of the annotation.

FIGS. 21A and 21B are tables illustrating the display order of animation.

DESCRIPTION OF THE EMBODIMENTS

Hereinafter, a description will be given of embodiments for performing the present invention with reference to attached drawings and the like.

First Embodiment

Figure 1:
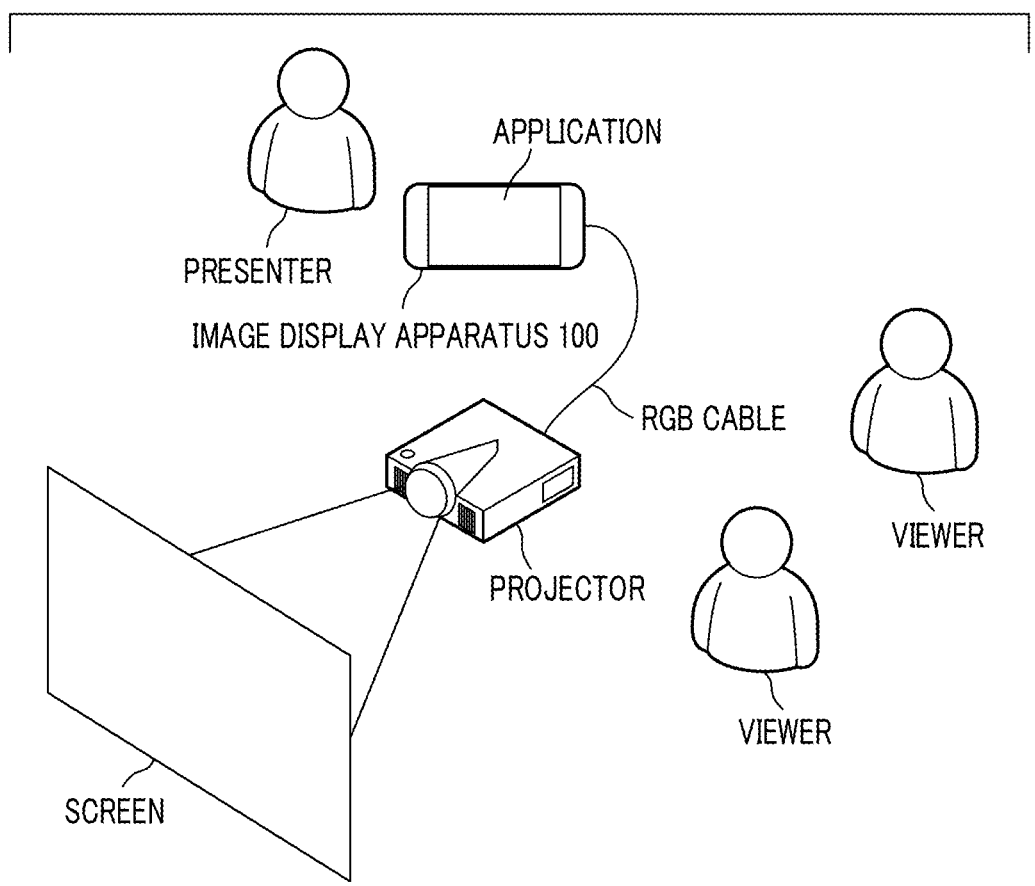
FIG. 1 is a schematic diagram in a case of performing a presentation by using an image display apparatus.

FIG. 1 is a conceptual diagram in a case of performing a presentation by using an image display apparatus 100 according to the embodiment. In the present embodiment, a case in which the presentation is performed in a conference room in an office is supposed. The image display apparatus 100 may be an information processing apparatus, for example, a portable information terminal such as a smart phone and a tablet personal computer. A presenter displays data in a predetermined format (hereinafter, referred to as "application image data") by operating an application in the image display apparatus 100. An operation method of the application will be described below, and thus, the detailed description here will be omitted. The application image data displayed on the image display apparatus 100 is output to a projector as an RGB (red, green, and blue) signal. Specifically, the projector and the image display apparatus 100 are connected through an RGB cable, and the RGB signal output from the image display apparatus 100 is input to the projector through the RGB cable. The projector projects the input RGB signal to a screen. In the present embodiment, application image data that is identical to the application image data displayed on the image display apparatus 100 is projected. Therefore, the viewer can browse the application image data displayed on the image display apparatus 100 by viewing the screen, and sharing with a plurality of viewers.

Note that, in the present embodiment, although the viewer browses the application image data using the screen, the viewer may browse it using a display included in the image display apparatus 100. Additionally, in the present embodiment, although the image display apparatus 100 that includes a touch panel serving as an input unit is used, the present invention is not limited to the touch panel and other input units may be used if the operation of the image display apparatus 100 and the entry of annotation to the application image data are possible. Hereinafter, the entry of annotation will be simply referred to as the "annotation".

Figure 2:
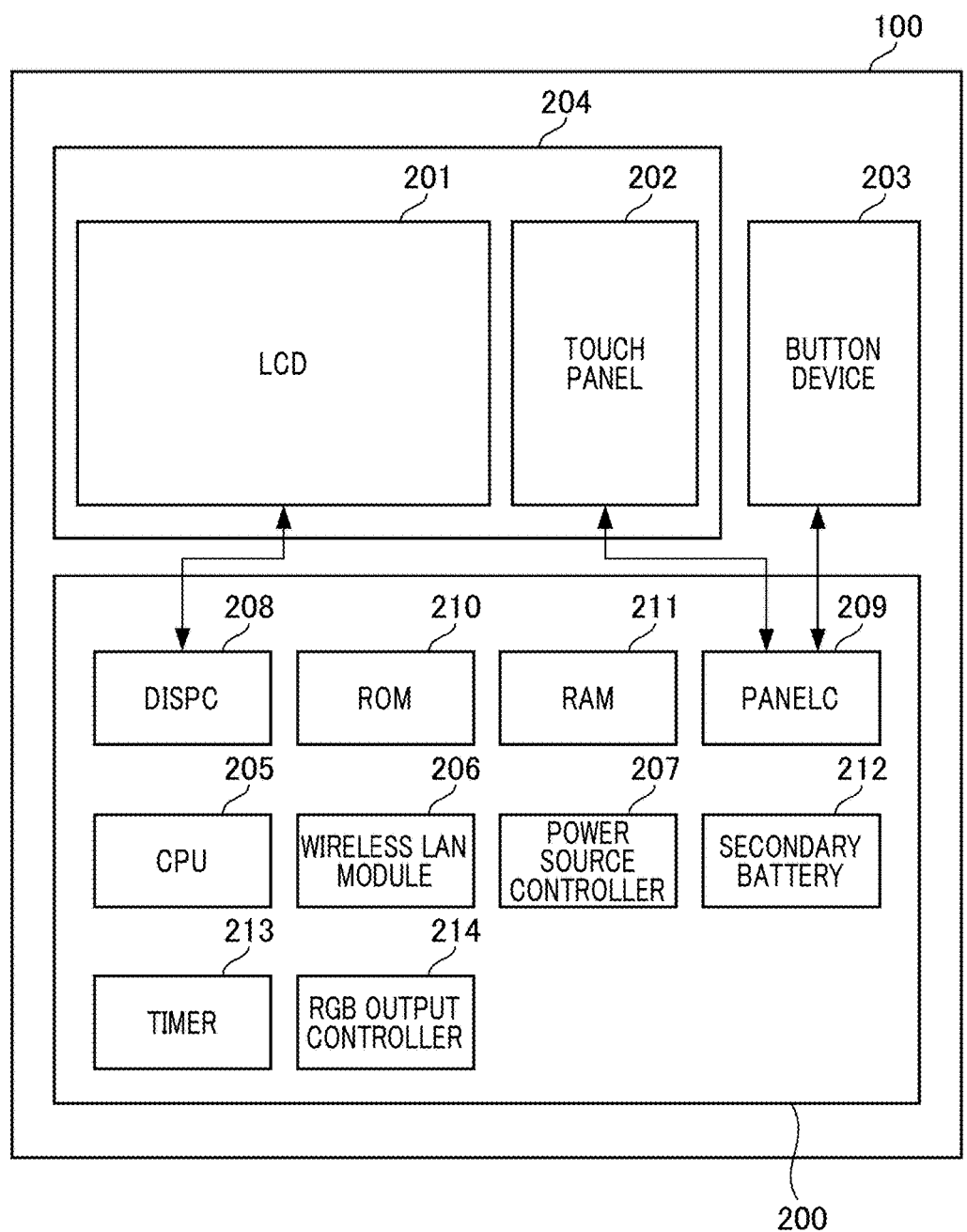
FIG. 2 is a hardware block diagram of the image display apparatus.

FIG. 2 is a block diagram illustrating a hardware configuration of the image display apparatus 100 according to the present embodiment. The image display apparatus 100 is configured by a main board 200, an LCD 201, a touch panel 202, and a button device 203. Note that, in the present embodiment, the LCD 201 and the touch panel 202 collectively configure a touch UI 204. Components of the main board 200 include a CPU 205, a wireless LAN module 206, a power source controller 207, and a display controller (DISPC) 208. Additionally, they include a panel controller (PANELC) 209, a ROM 210, a RAM 211, a secondary battery 212, a timer 213, and an RGB output controller 214.

Note that the components are communicably connected to each other through buses (not illustrated).

The CPU (Central Processing Unit) 205 controls each device connected to the bus, develops a software module 300 stored in the ROM (Read Only Memory) 210 into the RAM 211 and executes it. Note that a software module 300 will be described below. The RAM (Random Access Memory) 211 functions as a main memory of the CPU 205, a working area, a video image area to be displayed on the LCD 201, and a storage area of the application image data.

The display controller (DISPC) 208 switches the video image output that was developed into the RAM 211 at high speed in response to a request of the CPU 205, and outputs a synchronous signal to the LCD 201. Consequently, the video image of the RAM 211 is output to the LCD 201 in synchronization with the synchronous signal of the DISPC 208, and the video image is displayed on the LCD 201.

The panel controller (PANELC) 209 controls the touch panel 202 and the button device 203 in response to the request of the CPU 205. Hence, a depressed position on the touch panel 202 by an indicator, for example, a finger or a stylus pen, or a key code that was depressed on the button device 203 is reported to the CPU 205. Depressed position information consists of a coordinate value indicating an absolute position of the touch panel 202 in the horizontal direction (hereinafter, referred to as the "x-coordinate") and a coordinate value indicating the absolute position of the touch panel 202 in the vertical direction (hereinafter, referred to as the "y-coordinate"). Note that the touch panel 202 is capable of detecting the depression at a plurality of points, and in that case, the depression position information by the total number of the depressions is reported to the CPU 205.

The power source controller 207 is connected to an external power source (not illustrated) and supplied with electric power. Thus, the electric power is supplied to the entire image display apparatus 100 while charging the secondary battery 212 connected to the power source controller 207. If the electric power is not supplied from the external power source, the electric power from the secondary battery 212 is supplied to the entire image display apparatus 100.

The wireless LAN module 206 establishes wireless communication with a wireless LAN module on a wireless access point (not illustrated) connected to a LAN (not illustrated) that is built into an office (e.g., facilities) based on the control of the CPU 205, and mediates communication with the image display apparatus 100. The wireless LAN module 206 may be, for example, IEEE802.11b.

The timer 213 generates timer interruptions to a gesture event generation unit 301 described below, based on the control of the CPU 205. Additionally, the image display apparatus 100 includes a geomagnetic sensor (not illustrated) and an acceleration sensor (not illustrated), which are respectively connected to the buses. The timer 213 detects the tilt of the image display apparatus 100 based on the control of the CPU 205, and if the image display apparatus 100 obtains the tilt equal to or greater than a predetermined tilt, the timer 213 changes the orientation of the image display apparatus 100, and transmits an instruction to draw on the LCD 201 to a drawing unit 303 described below. If the orientation of the image display apparatus 100 is changed, the CPU 205 replaces the width and height of the LCD 201 and performs the following processing.

Specifically, the RGB output controller 214 switches the video image output that was deployed in the RAM 211 at high speed, and transmits the RGB video image signal to an external display device, for example, the projector. Consequently, the video image of the RAM 211 is output to the external display device, for example, the projector, and an image that is identical to the image on the LCD 201 is displayed on the screen projected by the projector.

Figure 3:
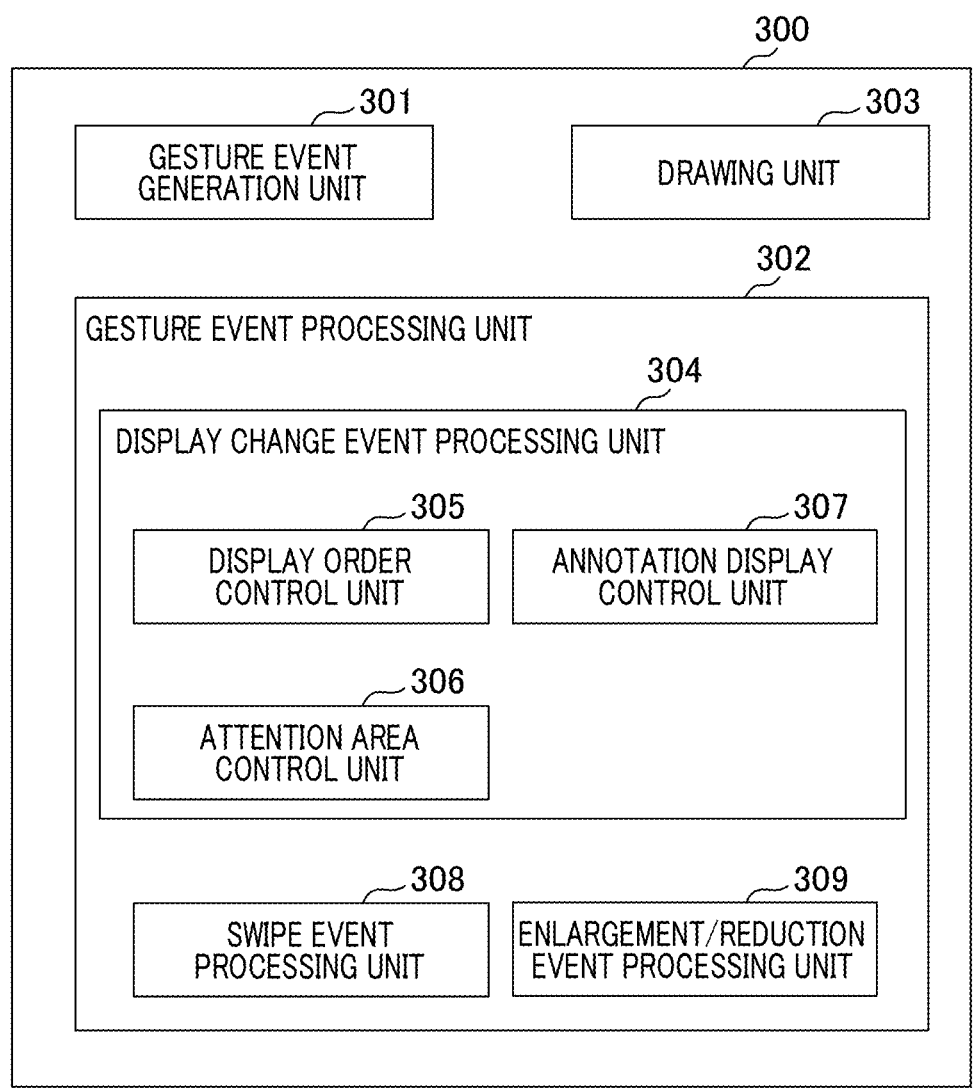
FIG. 3 is a software block diagram of the image display apparatus.
Figure 4:
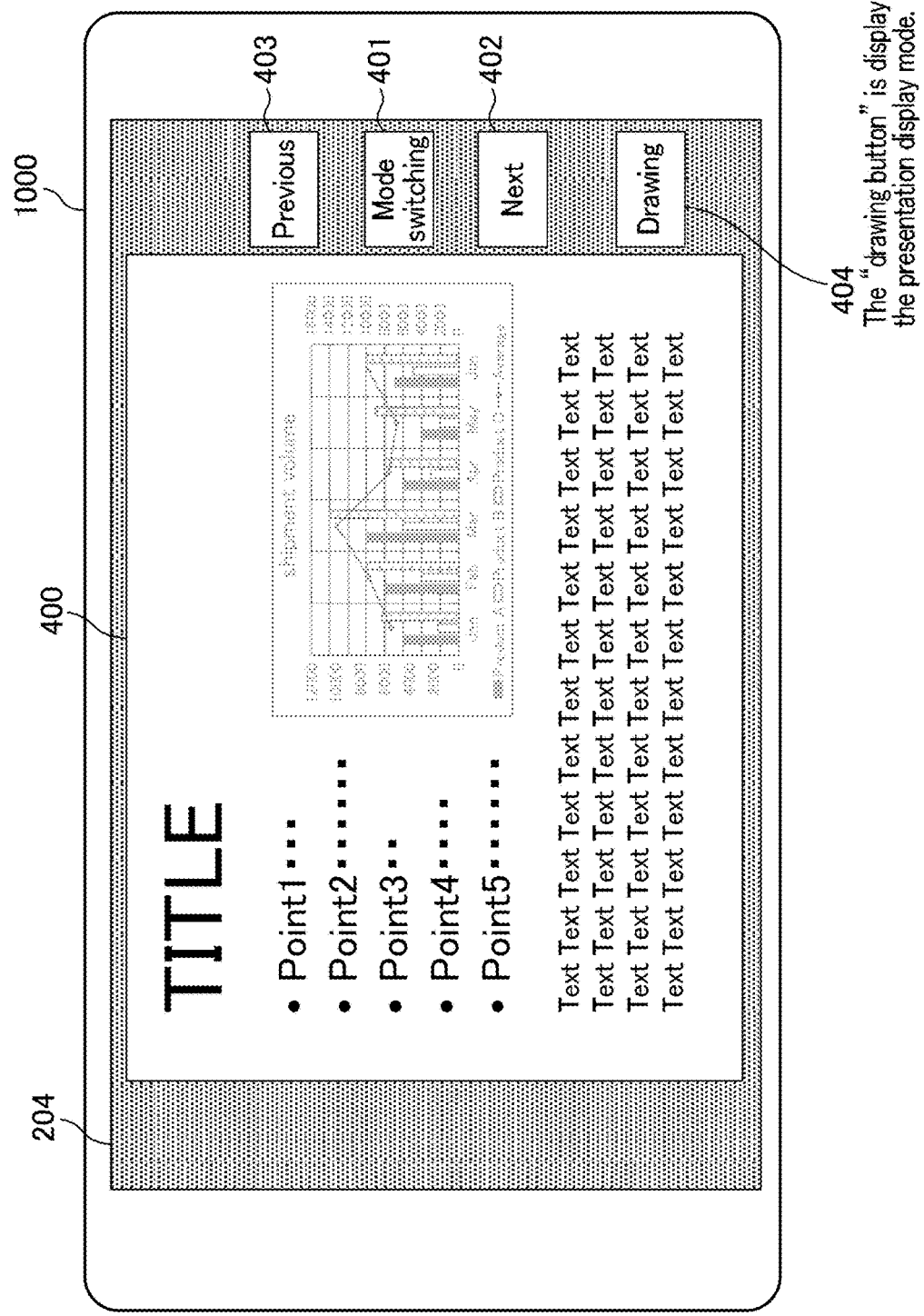
FIG. 4 is a diagram illustrating a screen display example of a touch UI of the image display apparatus.

Next, a description will be given of a software module related to the operation control of the application image data of the image display apparatus 100 according to the present embodiment, with reference to FIG. 3 and FIG. 4. FIG. 3 is a block diagram illustrating a configuration of a software module 300 that is executed in the CPU 205 of the image display apparatus 100. Additionally, FIG. 4 is a diagram illustrating an example of a screen display on the touch UI 204 of the image display apparatus 100 according to the present embodiment.

First, each module that configures the software module 300 will be described. The gesture event generation unit 301 receives a touch input of the user, generates a variety of gesture events, and transmits the generated gesture events to a gesture event processing unit 302. Note that, in the present embodiment, the various gesture events include a touch depression event, a touch release event, a single tap event, a double tap event, a swipe event, a pinch-in event, and a pinch-out event. Here, the various gesture events will be described.

In the touch depression event, the coordinate values of the latest touch coordinates and the touch coordinate number are transmitted to the gesture event processing unit 302. Note that the touch coordinates indicate the coordinates of one point where the user's finger is touching the touch panel 202, and it has a set of coordinate values represented by the x-coordinate and the y-coordinate. Additionally, the touch coordinate number indicates the number of the touch coordinates at which the user's finger touched the touch panel 202. The touch coordinates are updated if the user's finger touches the touch panel 202, the finger is moved, the finger is detached from the panel, or an interruption from the timer 213 is generated.

In the touch release event, the coordinate values and the coordinate number of the latest touch coordinates at the detachment timing of the user's finger from the touch panel 202 are transmitted to the gesture event processing unit 302. In the single tap event, the coordinate values of the latest touch coordinates are transmitted to the gesture event processing unit 302. The single tap indicates that the touch release event has been generated within a predetermined period of time after the aforementioned touch depression event. In the double tap event, the coordinate values of the latest touch coordinates are transmitted to the gesture event processing unit 302. The double tap indicates that the aforementioned single tap event has been generated twice within a predetermined period of time.

In the swipe event, the coordinate values of the latest touch coordinates, and the movement distance calculated based on the difference between the latest and the previous coordinates are transmitted. The swipe is a moving (so as to slide) operation of a fingertip in one direction while keeping the fingertip in contact with the touch panel 202. In the pinch-in event, a reduction ratio of the pinch-in calculated based on center coordinate values between two points of latest touch coordinates and a reduction distance of a straight line connecting the two points of the touch coordinates is transmitted. The pinch-in is an operation in which two finger tips approach (so as to pinch) each other while keeping the two finger tips in contact with the touch panel 202. In the pinch-out event, an enlarged ratio of the pinch-out calculated based on center coordinate values between two points of the latest touch coordinates and an enlarged distance of the straight line connecting the two points of the touch coordinates is transmitted. The pinch-out is an operation in which two finger tips separate (so as to spread the fingers) from each other while keeping the two finger tips in contact with the touch panel 202. Note that the mechanism of the generation of the above-mentioned gesture events is a known technique, and thus further detailed description will be omitted.

The gesture event processing unit 302 receives the gesture events that were generated in the gesture event generation unit 301, and executes the operation control according to each gesture event and a sentence structure described in the application image data. The drawing unit 303 draws the application image data to the LCD 201 in response to the execution result for the gesture event processing unit 302. A display method for the application image data will be described below.

If a display change event processing unit 304 receives the single tap event, it determines whether or not the coordinate values of the touch coordinate of the single tap event are positioned on any one of a mode switching button 401, a next button 402, a previous button 403, a drawing button 404 shown in FIG. 4. Subsequently, if the coordinate values of the touch coordinates of the single tap event are positioned on the "mode switching button" 401, mode switching processing described below is performed. Additionally, if the coordinate values of the touch coordinates are positioned on the "next button" 402, "the next selection processing" (next button selection processing) described below is performed, and if the coordinate values of the touch coordinates are positioned on the "previous button" 403, "previous selection processing" (previous button selection processing) described below is performed. If the coordinate values of the touch coordinates are positioned on the "drawing button" 404, "annotation drawing processing" (drawing button selection processing) described below is performed. However, the "drawing button" 404 is displayed only during a presentation display mode described below. The "next selection processing" and the "previous selection processing" are performed in a display order control unit 305 and an attention area control unit 306 in the display change event processing unit 304. Specifically, according to the order of the objects specified by the display order control unit 305, the objects are focus-displayed in order in the forward direction in the "next selection processing" or the objects are focus-displayed in order in the backward direction in the "previous selection processing". The "annotation drawing processing" is performed in an annotation display control unit 307.

A swipe event processing unit 308 performs processing on the swipe event. If the gesture event processing unit 302 receives the swipe event, the swipe event processing unit 308 moves the start point of the page 400 at the coordinates on the touch UI 204 in accordance with the movement distance of the swipe event. Subsequently, it updates the display state of the touch UI 204 based on this. An enlargement/reduction event processing unit 309 performs processing on the pinch-in event or the pinch-out event. The gesture event processing unit 302 receives the pinch-in event or the pinch-out event, controls the start point and a display magnification of the page 400 in accordance with the reduction ratio or the enlargement ratio of the aforementioned two events, and updates the display state of the touch UI 204.

Next, a description will be given of a generation method of the application image data, which is data in a predetermined format for the display on the image display apparatus 100. The application image data is obtained by an image reading unit in a MFP (not illustrated) that is a multifunction printer realizing a plurality of types of functions (e.g., a copy function, a printing function, and a transmitting function). Alternatively, the application image data is generated by rendering a document generated by application software on a client's personal computer (not illustrated), which is an information processing apparatus including a personal computer, inside the MFP. The MFP and the client's personal computer are connected to a LAN (not illustrated) that is built in the office (e.g., facilities), and they can transmit and receive the data with each other.

First, object division processing, which divides the bitmap image data that was obtained at the image reading unit of the MFP or generated by the application software on the client's personal computer into the objects for each attribute, is performed. The type of the attribute of the object after dividing the object indicates characters, photographs, and graphics (drawings, line drawings, tables, and lines). The type of the object (characters, photographs, and graphics) is determined with respect to each of the divided objects.

Next, it is determined whether or not the object is characters, and if the object is characters, OCR processing is further performed, and character coded data (character coded data as a result for the OCR) is obtained. Note that the OCR is a known technique and the detailed description will be omitted. With respect to each of the divided objects, an area of the object is cut out from the bit map image data by using positional information of the object, and the object image is generated. Resolution of the object is converted according to the type of the attribute of the object so as to maintain a suitable quality while suppressing an amount of the data.

Next, the resolution of the bitmap image data is converted, and a background image having a resolution lower than that of the bitmap image data is generated. In the present embodiment, the resolution is one-fourth of the bit map image data by using a nearest neighbor method, that is, the background image having 150 dpi is generated if the bit map image data has 600 dpi. Note that the method of converting resolution is not limited to the nearest neighbor method, and, for example, a highly accurate interpolation method including a bilinear method or a bicubic method may be used. Subsequently, a JPEG-compressed background image by using a background image having a resolution lower than the generated bitmap image data is generated. Each of the object data, the background image data, and the character coded data is obtained based on a sentence structure tree described below, and application image data that can be displayed on the image display apparatus 100 is generated. Note that the method for generating application image data is a known technique, and thus, more detailed description will be omitted.

Figure 5:
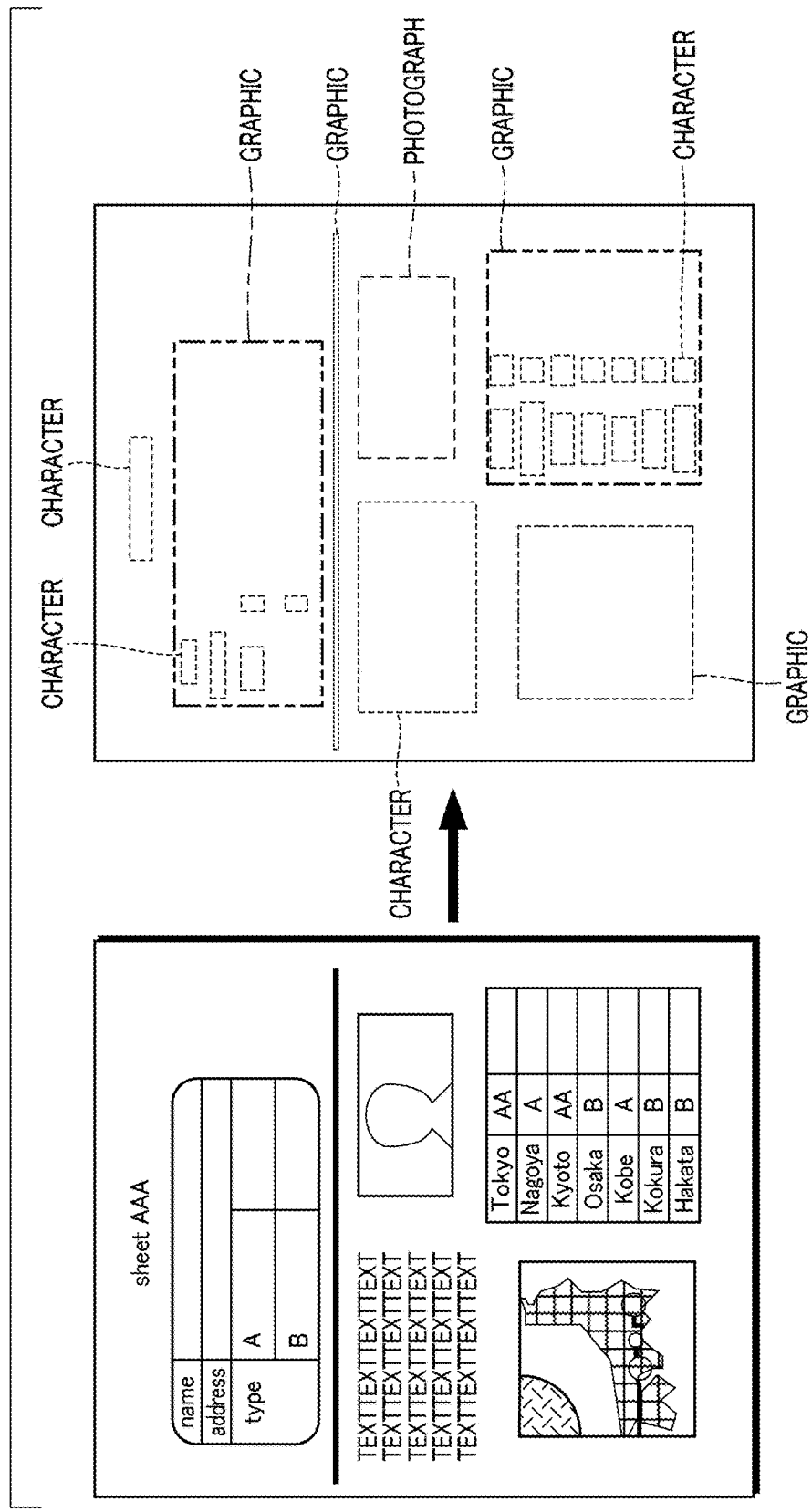
FIG. 5 is a diagram illustrating an example of a result for dividing an object.

Next, the object division will be described in detail with reference to FIG. 5 and FIG. 6. FIG. 5 is a diagram illustrating an example of a result for dividing the bitmap image data into a plurality of objects by object division processing. FIG. 6 is a table illustrating block information and input file information for each object if the object is divided.

First, the object division processing is performed on the input image (the left in FIG. 5), and the objects are divided into rectangular blocks for each attribute (the right in FIG. 5). As described above, characters, photographs, graphics (drawings, line drawings, tables, and lines), and the like are the attribute of the rectangular block. As one approach to the object division processing, for example, there is a method in the following.

First, the image data stored in the RAM (not illustrated) in the MFP is binarized into black and white, and a pixel block surrounded by black pixel outlines are extracted. Subsequently, the size of the extracted black pixel block is evaluated, and the outlines tracing a white pixel block inside the black pixel block having a size of a predetermined value or more is performed. As long as the pixel block in the inside has a size of the predetermined value or more as a result for evaluating the size of the white pixel block and performing the outline tracing on the black pixel block inside the white pixel block, the extraction of the pixel block in the inside and the outline tracing are recursively performed. The size of the pixel block is evaluated by, for example, the area size of the pixel block. The rectangular block that circumscribes the pixel block obtained in this way is generated, and the attribute is determined based on the size and shape of the rectangular block. For example, the rectangular block in which the aspect ratio is close to 1 and the size is in a fixed range serves as a character corresponding block may be a character area rectangular block. Additionally, if the character corresponding blocks adjacent each other are regularly aligned, a new rectangular block that summarizes this character corresponding blocks is generated, and the new rectangular block serves as a character area rectangular block. Additionally, the black pixel block that includes flat pixel blocks, or the white pixel blocks having a fixed size or more and square shape in the aligned state serves as a graphic area rectangular block, and other amorphous pixel blocks serve as photograph area rectangular blocks.

As described above, regarding each of the rectangular blocks generated as described above, a table illustrating the block information of the attribute and the like and input file information shown in FIG. 6 is generated. In FIG. 6, the attribute, the coordinate-X and the coordinate-Y of the position, the width W, the height H, and the OCR information of each block are included in the block information. The values of 1 to 3 are given to attributes. In the present embodiment, the attribute 1 indicates the character area rectangular block, attribute 2 indicates the photograph area rectangular block, and the attribute 3 indicate the graphic area rectangular block. The coordinate-X and the coordinate-Y are the X and Y coordinates at the start points of each rectangular block in the input image (coordinates at the upper left corner). The width W is the width of the rectangular block and in the X-coordinate direction and the height H is the height of the rectangular block in the Y-coordinate direction. The OCR information indicates the presence or absence of pointer information to the character encoded data by the OCR processing. Moreover, the total number of the blocks N indicating the number of the rectangular blocks is also stored as the input file information.

The block information for each rectangular block is used in the application image data generation processing described below. Additionally, a relative positional relationship if overlapping a specific area and other areas can be specified by the block information, and overlapping each area without impairing the layout of the input image is made possible. Note that the method of dividing the object is a known technique, and thus more detailed description will be omitted.

Figure 7:
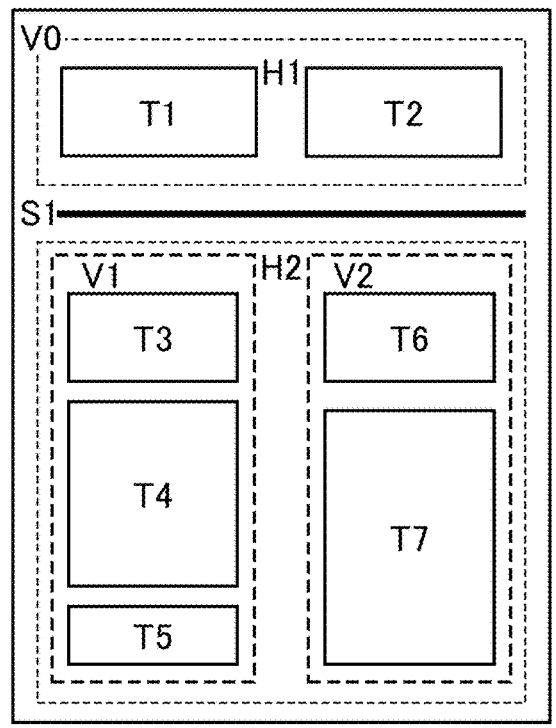
FIG. 7 is a diagram illustrating a sentence to be a target for sentence structure tree generation processing.
Figure 8:
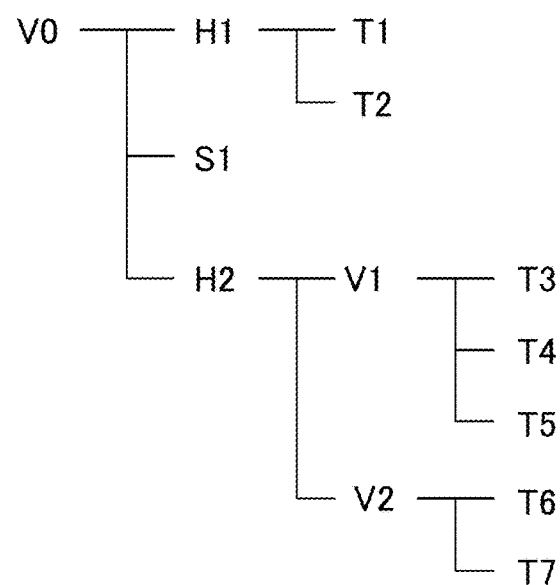
FIG. 8 is a diagram illustrating the sentence structure tree that is generated in the processing of FIG. 7.

Next, with reference to FIG. 7 and FIG. 8, a description will be given of sentence structure tree generation processing. FIG. 7 is a diagram illustrating one example of a sentence to be the sentence structure tree, and FIG. 8 is a diagram illustrating the sentence structure tree generated by the sentence structure tree generation processing. Note that the sentence structure tree generation is processing that is performed in a process of the application image data generation by the MFP.

First, the MFP regroups the rectangular blocks in unit of the rectangular block on the basis of relevance in the vertical direction. For example, in the sentence shown in FIG. 7, rectangular blocks T1 and T2 are arranged in parallel in the horizontal direction at the top. A horizontal direction separator S1 exists under the rectangular blocks T1 and T2, and rectangular blocks T3, T4, T5, T6, and T7 exist under the horizontal direction separator S1. The rectangular blocks T3, T4, and T5 are arranged in the vertical direction from top to bottom in the left half portion in the lower area of the horizontal direction separator S1, and the rectangular blocks T6 and T7 are arranged from top to bottom in the right half portion in the lower area of the horizontal direction separator S1. If the processing of a grouping based on the relevance in the vertical direction is executed, the rectangular blocks T3, T4, and T5 are summarized in one group (rectangular block) V1, and the rectangular blocks T6 and T7 are summarized in one group (rectangular block) V2. The groups V1 and V2 are on the same layer.

Next, the presence or absence of a separator in the vertical direction is checked. The separator is an object having a line attribute and has a function of explicitly dividing the block. If the separator is detected, the area of the input image is divided into left and right areas along the separator as the boundary, in the layer to be processed. Note that, in the present embodiment, the separator in the vertical direction does not exist in FIG. 7.

Next, it is determined whether or not the sum of the group height in the vertical direction becomes equal to the height of the input image. That is, in a case where the grouping in the horizontal direction is performed while moving the area to be processed in the vertical direction (for example, from top to bottom), if the processing of the entire input image has ended, the finish determination of the processing may be carried out by using a fact in which the sum of the group height becomes the height of the input image. If the grouping has ended, the process ends as it is, and if the grouping has not ended, the process proceeds to the grouping processing based on the relevance in the horizontal direction.

By the grouping processing in the horizontal direction, for example, the rectangular blocks T1 and T2 shown in FIG. 7 are summarized into one group (rectangular block) H1, and the rectangular blocks V1 and V2 are summarized into one group (rectangular block) H2. Note that the groups H1 and H2 are on the same layer. Next, the presence or absence of the separator in the horizontal direction is checked. If the separator is detected, the area of the input image is divided into top and bottom areas along the separator, which serves as the boundary, in the layer to be processed. In FIG. 7, the separator S1 of the horizontal direction is present. The results for the process described above are registered as a tree shown in FIG. 8.

In FIG. 8, the bit map image data V0 of one page that was input has the groups H1 and H2 and the separator S1 on the highest layer, and the rectangular blocks T1 and T2 on the second layer belong to the group H1. The groups V1 and V2 on the second layer belong to the group H2, the rectangular blocks T3, T4, and T5 on the third layer belong to the group V1, and rectangular blocks T6 and T7 on the third layer belong to the group V2. In the present embodiment, V0 represents the page, and groups present in the lower layers of V0 become the objects.

Finally, it is determined whether or not the sum of the group length in the horizontal direction is equal to the width of the input image. Accordingly, the determination of completion with respect to the grouping in the horizontal direction is performed. If the group length in the horizontal direction is the page width, the sentence structure tree generation processing ends. If the group length in the horizontal direction is not the page width, the process returns to the initial process, and again, on one upper layer, the process is repeated from the relevancy checking of the vertical direction.

Figure 9:
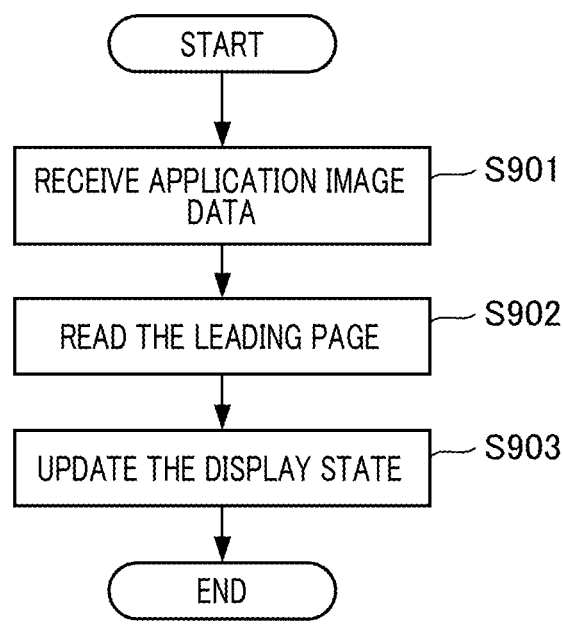
FIG. 9 is a flowchart illustrating the reproduction of application image data.

Next, with reference to FIG. 4 and FIG. 9, a description will be given of processing at the time of reproducing the application image data by the image display apparatus 100 according to the present embodiment. FIG. 9 is a flowchart illustrating the reproduction of the application image data by the image display apparatus 100.

First, in step S901, the image display apparatus 100 receives the application image data from the MFP via the wireless LAN module 206, and stores the received application image data in the RAM 211. Next, in step S902, the syntax of the application image data stored in the RAM 211 is analyzed, and the head page is read. Next, in step S903, the drawing unit 303 performs rendering of the background included in the head page that has been read according to the coordinates of the start point, the width and the height in the area information, and updates the display state of the touch UI 204.

At this time, as shown in page 400 of FIG. 4, the display magnification of the head page is controlled such that the height of the page 400 matches that of the touch UI 204 or the width of the page 400 matches that of the touch UI 204. Additionally, if the width or the height of the page upon the reduction of the page at the display magnification is smaller than the touch UI 204, the start point of the page 400 is controlled in the coordinates on the touch UI 204 such that the page is displayed in the center of the touch UI 204. Thus, the display control method for displaying the entire page in the touch UI 204 is referred to as a "page display mode", in the present embodiment.

Figure 10:
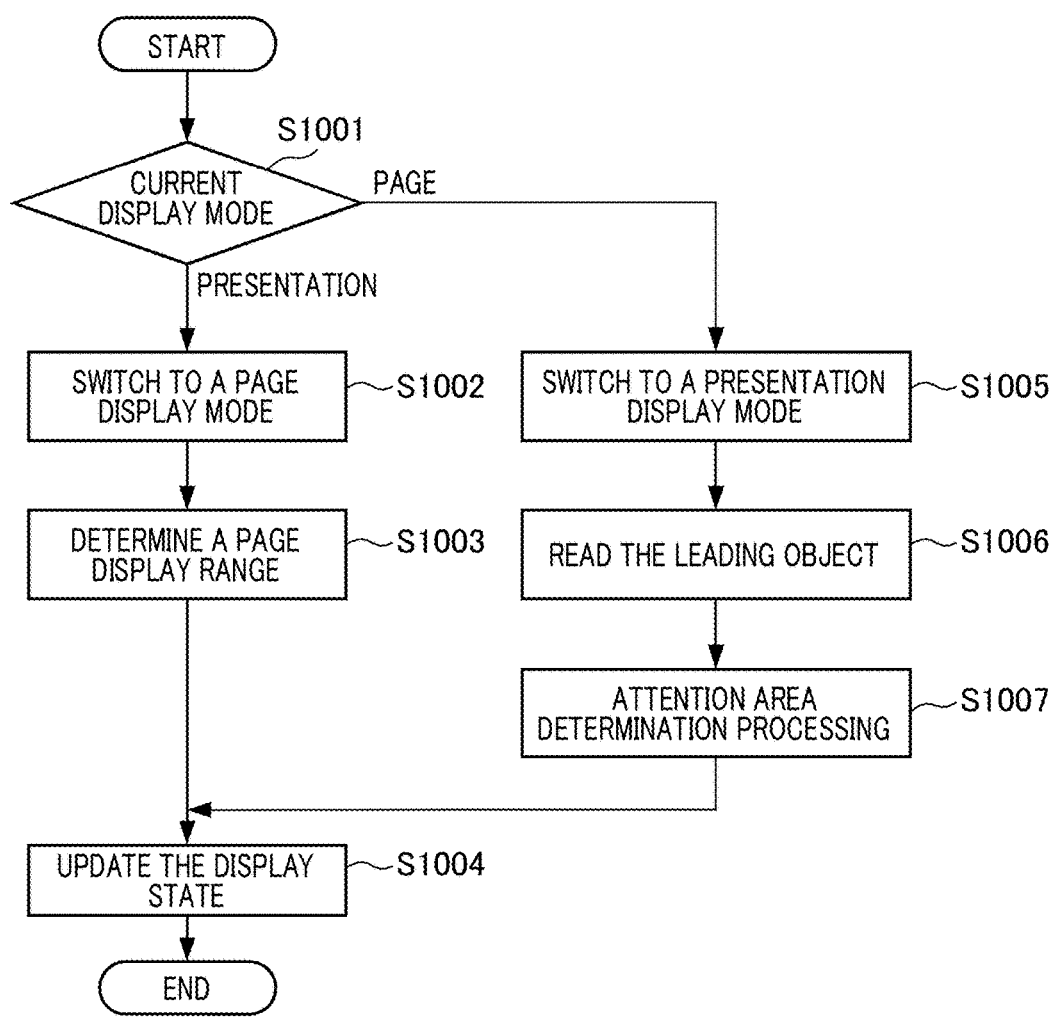
FIG. 10 is a flowchart illustrating mode switching processing.

Next, with reference to FIG. 10, FIGS. 11A to 11D, FIGS. 12E to 12H, and FIGS. 15A to 15C, a description will be given of mode switching processing executed in the display change event processing unit 304. FIG. 10 is a flowchart of the mode switching processing. FIGS. 11A to 11D and FIG. 12E to 12H are examples of the screen display of the touch UI 204 in the image display apparatus 100 according to the present embodiment. FIGS. 15A to 15C are tables illustrating the display states of the objects of the examples of the screen display on the touch UI 204 in FIGS. 11A to 11D and FIGS. 12E to 12H.

First, in step S1001, the display change event processing unit 304 obtains the display mode being set in the image display apparatus 100 at the point in time if that instructions for the mode switching button have been provided. The display mode indicates a method in which the image display apparatus 100 displays the application image data on the touch UI 204, and the image display apparatus 100 according to the present embodiment has the following two display modes. A first display mode is the page display mode suitable for displaying the entire page. As shown in FIGS. 11A to 11D and FIGS. 12E to 12H, a second display mode is a presentation display mode that is suitable for displaying a part of the areas in the page (that is, each object in the page image) with highlights so as to facilitate focusing user's attention (focus display). As described above, immediately after the image display apparatus 100 has received the application image data, the page display mode is set. The presentation display mode is a mode that displays the area of attention on the page 400 such that each object in the page 400 is displayed with highlights, as shown in FIGS. 11A to 11D and FIGS. 12E to 12H. Note that, in the present embodiment, there are cases in which the area of attention is referred to as the attention target, or the attention object, but these have the same meaning.

Figure 11A:
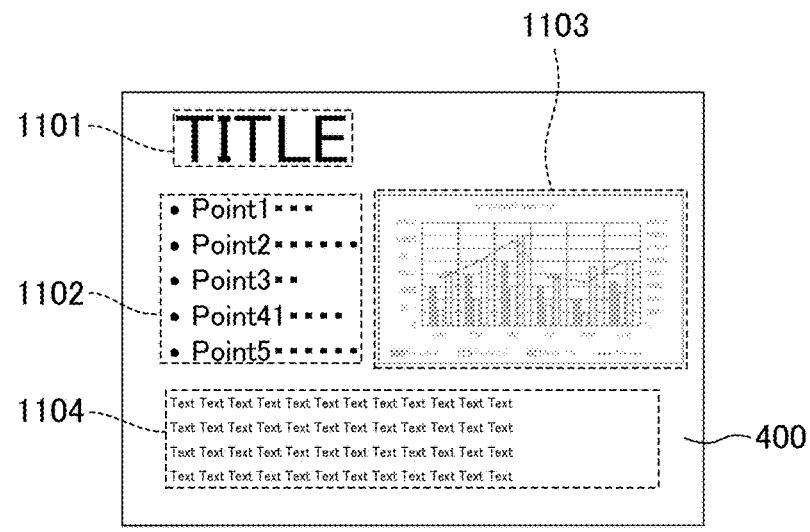
FIGS. 11A to 11D are diagrams illustrating an example of annotation display on the touch UI of the image display apparatus.
Figure 11B:
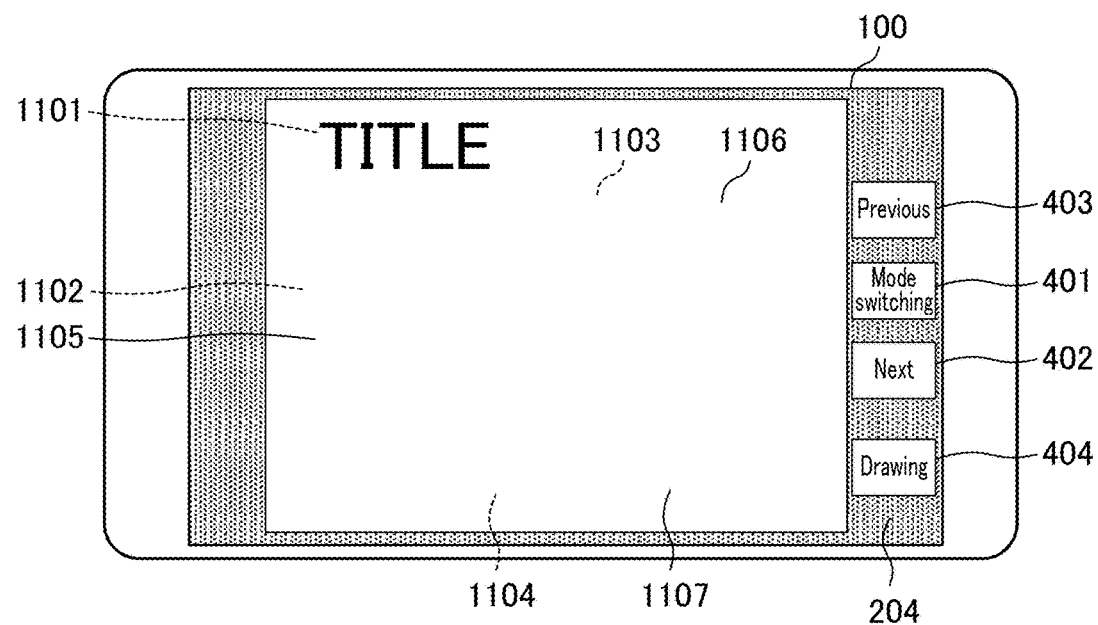

Here, a screen that is displayed if the character object 1101 is selected as the object in the area of attention is shown in FIG. 11B. Note that the broken lines surrounding the objects 1101 to 1104 in FIG. 11A are drawn in order to simplify the description, and they are not present on the actual page 400. Additionally, in the present embodiment, in order to clearly distinguish the display states of the object, a table that assigns IDs to the objects is generated. For example, the objects 1101 to 1104 in FIGS. 11A to 11D and FIGS. 12E to 12H are respectively assigned to the object IDs 1 to 4, and the display states of the corresponding object IDs are shown in tables of FIGS. 15A to 15C described below. Note that the object IDs of FIGS. 15A to 15C are generated in the display order, based on the sentence structure tree. That is, if the objects 1101 to 1104 are displayed in order by the sentence structure tree (not illustrated) of the application image data in FIGS. 11A to 11D and FIGS. 12E to 12H, the object IDs 01 to 04 are assigned associated with the order of the objects 1101 to 1104.

In the present embodiment, as shown in FIG. 11B, with respect to the objects 1102 to 1104 other than the object 1101 of the attention target, masks 1105 to 1107 that are respectively opaque are displayed superimposed on the page 400. Accordingly, only the object 1101 of the target of attention is made to be easily seen. Because the objects other than the object of the attention target are not displayed by displaying such masks superimposed, the object of the target of attention is highlighted, so that the user can easily specify the area of the object that is a display target. Note that, in the present embodiment, although white opaque masks are displayed superimposed on the objects other than the object of the target of attention, it may be possible to display a mask having a color that matches the background by obtaining the background color in advance if the background has a color other than white.

First, in step S1001, the display change event processing unit 304 determines the display mode being set (current) if an instruction is provided to the mode switch button 401 is either of the presentation display mode or the page display mode. Subsequently, if the display mode being set is the presentation display mode, the process proceeds to step S1002, and if it is the page display mode, the process proceeds to step S1005.

Next, in step S1002, the display change event processing unit 304 sets the mask 1105 in FIG. 11B to the non-display (mask OFF), and switches the mode to the page display mode. Next, in step S1003, the display change event processing unit 304 controls the display magnification of page 400 in accordance with the height of the touch UI 204, controls the starting point of the page 400, and determines the display range of the page. Subsequently, in step S1004, the display change event processing unit 304 updates the display state of the touch UI 204 based on the display range of the determined page. In contrast, if the display mode being set is the page display mode, the display change event processing unit 304 switches the display mode to the presentation display mode and changes to the setting that displays the masks 1105 to 1107 (mask ON), in step S1005.

Next, in step S1006, the display change event processing unit 304 reads the head object on the page 400, and obtains the start point, the width, and the height of the head object. Here, the head object is the object that was first read, in the sentence structure tree of the application image data. Next, in step S1007, the attention area controlling unit 306 in the display change event processing unit 304 performs attention area determination processing, and updates the display state of the touch UI 204 based on the mask area determined in step S1004.

Note that, in the attention area determination processing of step S1007, the head object that has been read in step S1006 serves as the area of attention, and the object in which the masks are displayed superimposed on the touch UI 204 is determined. For example, in FIG. 11B, because the masks 1105 to 1107 are respectively covered on the objects 1102 to 1104 other than the object 1101 that is the display target at this time, the user can easily identify the object 1101 that is the target of attention. Additionally, a table showing the display state of the object at this time is generated as shown in FIG. 15A. Specifically, an "attention state flag" of the object 1101 (object ID: 01) is set to 1, which indicates a state of focusing attention, and an "already displayed flag" thereof is set to 1, which indicates a state in which the object has already been read and displayed. Additionally, the attention state flags of the objects 1102 to 1104 (object IDs: 02 to 04) are set to 0, which indicates a state of not focusing attention, and the already displayed flags thereof are set to 0, which indicates a state in which the object has not yet been read and displayed. Accordingly, the application is able to clearly distinguish the object area that is displayed with attention, the object area that is not displayed with attention by using the opaque mask, and an object area that is covered with a semi-opaque mask described below.

Next, with reference to FIGS. 11A to 11D, FIGS. 12E to 12H, FIG. 13, and FIGS. 16A and 16B, a description will be given of annotation display processing performed in the annotation display control unit 307. FIG. 13 is a flowchart of the annotation generation. FIGS. 16A and 16B are tables illustrating the attribute information of the annotation in the example of the annotation display in FIGS. 11A to 11D, and FIGS. 12E to 12H.

First, in step S1201, if the drawing button 404 is tapped during the presentation display mode, except for the drawing button 404 the display change event processing unit 304 turns OFF the input to the buttons 401 to 403, and switches the mode to an annotation entry mode. Note that, in the present embodiment, the drawing button 404 is displayed only during the presentation display mode and the annotation entry mode, and it is impossible to tap it during the page display mode. The annotation entry mode is, for example, a mode in which entry is manually performed in the page 400 shown in FIG. 11B via the touch UI 204.

Figure 11C:
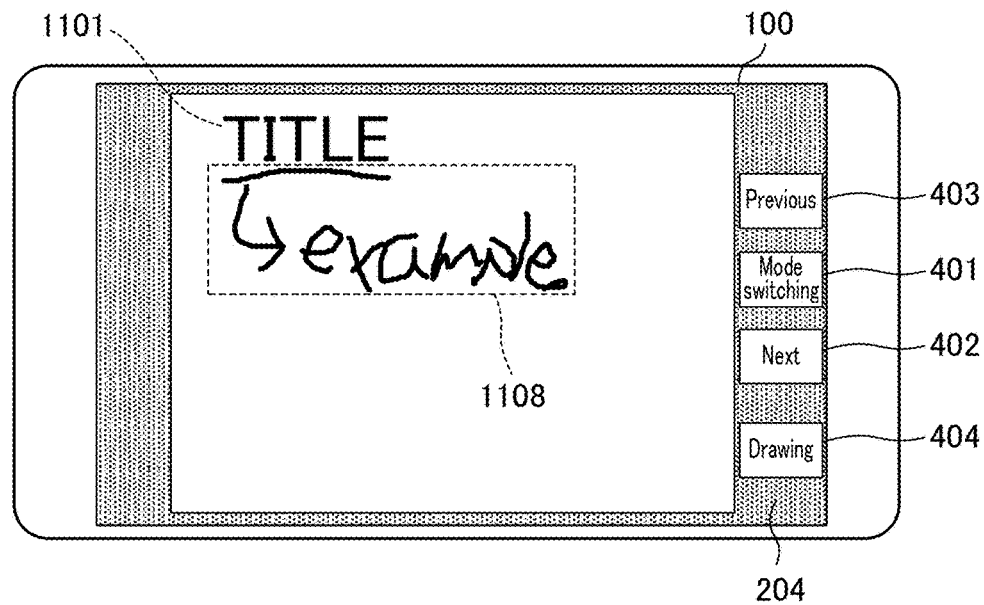

Here, FIG. 11C illustrates an example of the screen that is displayed if the user enters the annotation in the page 400. A rectangular area surrounded by broken lines in FIG. 11C is an area of the entered annotation 1108. However, the broken lines in FIG. 11C are drawn in order to clearly show the annotation area, and they are not present on the actual page 400. Additionally, in the present embodiment, a table in FIG. 16A described below is generated for controlling the display state of the annotation.

Next, in step S1202, it is determined whether or not the drawing button 404 has been tapped. If the drawing button 404 has been tapped (YES), the process proceeds to step S1203, and if the drawing button 404 has not been tapped (NO), the process proceeds to step S1207. Note that, in the present embodiment, if the drawing button 404 has been tapped during the annotation entry mode, the process shifts to the finish processing of the annotation entry mode. That is, as long as the drawing button 404 has not been tapped again, the process does not shift to the presentation display mode from the annotation entry mode.

Next, in step S1203, the annotation image is generated from the entered annotation drawing. In the present embodiment, a png file in which the transmittance is freely settable is generated as the annotation image. However, the present invention is not limited to the png file, and another file may be used if it is an image file in which the transmittance is settable. Next, in step S1204, the attribute information of the annotation image generated in step S1203 is generated. For example, the attribute information of the annotation 1108 in FIG. 11C is generated as a table shown in FIG. 16A.

Here, a description will be given of the table illustrating the attribute information of the annotation in FIG. 16A. Regarding the "annotation ID" in FIG. 16A, a unique value is assigned to each annotation image to be generated. The "page" indicates a page of the application image data on which the annotation image is entered. The "corresponding object ID" is an object ID in which the attention state flag in FIGS. 15A to 15C is 1 if the annotation image is entered. That is, it indicates the ID of the object displayed with attention if the annotation image is entered. The "transmittance" indicates the transmittance of the entered annotation image, and if the transmittance is 0[%], it indicates an opaque state that is completely visible, and if the transmittance is 100[%], it indicates a transparent state that is completely invisible. From the above, the annotation 1108 in FIG. 11C is an annotation image that was entered if the object 1101 (object ID: 01) is displayed for attention, and thus the corresponding object ID of the attribute information of the annotation becomes 01. Additionally, in FIG. 11C, because the object 1101 is the target of attention, the transmission attribute of the annotation 1108 becomes the opaque state (0%). Note that the detailed description of the control of the transmittance will be described below.

The annotation image and the attribute information of the annotation are held as a set of the annotation. Subsequently, the attribute information of the annotation is reentered, and thus the control of the annotation image can be performed. Additionally, the attribute information of the annotation also holds information about an entry position of the annotation. Specifically, the attribute information about the annotation includes the coordinate-X, the coordinate-Y, the width W, and the height H of the position of each annotation, in a state similar to the block information of the object. In FIGS. 16A and 16B, the positional information of the annotation will be omitted for simplicity. Hereinafter, if the annotation is disclosed, it will be considered as disclosing the set of the annotation image and the attribute information of the annotation.

Next, in step S1205, the image display apparatus 100 finishes the annotation entry mode, and switches the mode to the presentation display mode. In the present embodiment, the process shifts to the display state of the object that is immediately before the shift to the annotation entry mode in step S1201. For example, if the state immediately before the shift to the annotation entry mode is a state in which the object 1101 in FIG. 11B is displayed with attention, the process shifts to the presentation display mode that is the same display state of the object thereof. Next, in step S1206, the display state of the touch UI 204 is updated based on the generated annotation. For example, if the annotation 1108 is entered in FIG. 11B, the touch UI 204 changes to the display state in FIG. 11C.

In contrast, in step S1207, the annotation display control unit 307 determines whether or not a touch depression event (input) on the touch UI 204 has been detected. If the touch depression event has been detected (YES), the process proceeds to step S1208, and if the touch depression event has not been detected (NO), the process returns to step S1202.

Subsequently, in step S1208, the drawing processing of the annotation is performed based on the coordinate values by the touch input to the touch UI 204 in step S1207. For example, in response to the touch input, the drawing display of the annotation 1108 shown in FIG. 11C is performed. Note that, in the present embodiment, although a line width and a color of the annotation are steadily displayed, those values can be freely changed by setting change by the user (not illustrated).

Next, with reference to FIGS. 11A to 11D, FIGS. 12E to 12H, FIG. 14, FIGS. 15A to 15C, and FIGS. 16A and 16B, a description will be given of "next selection processing (next button selection processing)" that is executed if the "next button" 402 is tapped (specified) by the user. FIG. 14 is a flow chart of the next selection processing.

First, the display change event processing unit 304 obtains the display mode that is set in the image display apparatus 100 if the "next button" 402 is tapped. Subsequently, in step S1301, it is determined that the obtained display mode is either of the presentation display mode or the page display mode. If the obtained display mode is the presentation display mode, the process proceeds to step S1302, and if it is the page display mode, the process proceeds to step S1308. Next, in step S1302, the display order control unit 305 selects the object to be displayed next based on the sentence structure tree from among all the objects in the page currently read, and reads the object.

Here, the display order of the objects will be described. In the present embodiment, the display order on the document tree structure is the object belonging to the lowest layer of the upper layer of the heading, subsequently the object belonging to the same layer of the object. Moreover, after finishing the display of all the objects belonging to the same layer, the display is in the order of the object belonging to the lowest layer of the next upper layer, and subsequently the object belonging to the same layer.

For example, in FIG. 8, V0 represents the page, and the object to be read first is T1. If the "next selection processing" is performed in a state where the object of T1 is displayed on the touch UI 204 in the presentation display mode, the object of the T2 is read because the T1 has the same layer. Moreover, if the "next selection processing" is performed in a state where the object of T2 is displayed, S1 that is positioned on the next higher layer is read because the next object is not present in the layer same as T2. In this case, S1 has no lower layer, and therefore S1 is positioned on the lowest layer. Note that, in the present embodiment, it is also possible to select only the object having a specific attribute including the object of the character attribute, or possible to select the object other than only specific attributes. Additionally, the order of the object IDs shown in FIGS. 15A to 15C is generated corresponding to the display order.

Next, in step S1303, the display order control unit 305 determines whether or not the next object can be read in step S1302. That is, it is determined whether or not the object is finished depending on the presence or absence of a selectable object. If the next object can be read (if the selectable objects was present: NO), the object that has been read serves as an object to be processed, and the process proceeds to step S1304. In contrast, if the next object cannot be read (if the selectable object was absent: YES), the process proceeds to step S1307.

Next, in the attention area determination processing in step S1304, the next object that was read as the object to be processed in step S1302 serves as the area of attention, and the object in which the mask areas are displayed superimposed on the touch UI 204 is determined. For example, as the object following the object 1101 in FIG. 11B, the screen displayed if the object 1102 is selected as the object that is the target of attention is shown in FIG. 12E. In the present embodiment, as shown in FIG. 12E, with respect to the objects 1103 and 1104 to be the target of attention after the object 1102 that is the target of attention, the masks 1106 and 1107 that are each opaque are displayed superimposed on the page 400. Additionally, because the object 1101 is displayed as the object that has already been the target of attention before the display of the object 1102, a semi-transparent mask 1109 that is a semi-transparent white is displayed superimposed on the page 400. With this manner, the object that has already been displayed is displayed in an inconspicuous state while indicating that the display is done, and the object 1102 that is currently the target of attention can be displayed in an easily viewable state. Note that the display states of the objects in FIG. 12E, and FIG. 11D and FIG. 12F described below are illustrated as FIG. 15B. In FIG. 12E, because the object 1102 (object ID: 02) is a new target of attention, the attention state flag and the already displayed flag in FIG. 15B are set to 1. Additionally, the semi-transparent mask 1109 in FIG. 12E is displayed if the attention state flag is set to 0 and the already displayed flag is set to 1 in FIG. 15B. Similarly, the opaque mask in FIG. 12E is displayed if the attention state flag is set to 0 and the already displayed flag is set to 0 in FIGS. 15A to 15C.

Figure 12E:
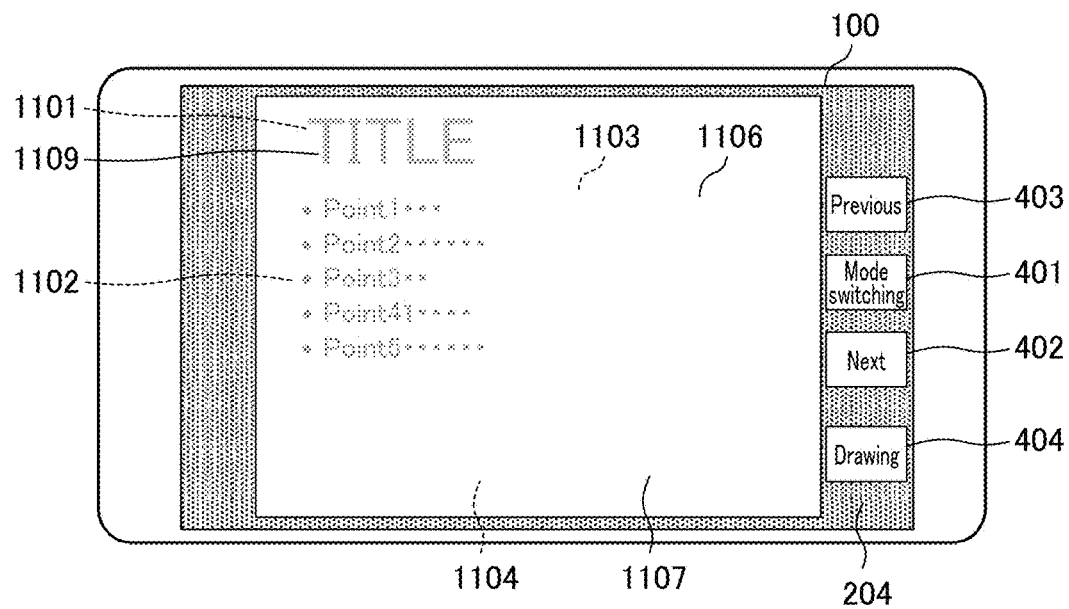
FIGS. 12E to 12H are diagrams illustrating an example of the annotation display on the touch UI of the image display apparatus.
Figure 12F:
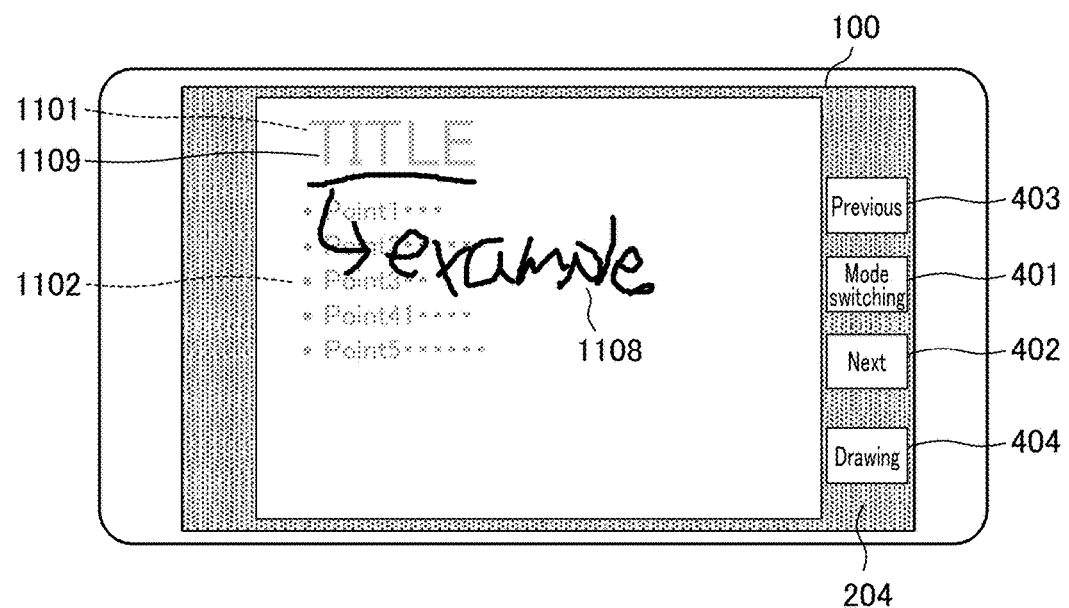

Next, in step S1305, the annotation change processing is performed. Simply explained, deletion of the annotation is performed. For example, the annotation 1108 entered in FIG. 11C is deleted in the annotation change processing, and it is displayed as shown in FIG. 12E after updating the display state in step S1306. With this manner, if the object 1102 to be displayed next is the target of attention, the annotations are not displayed superimposed. Therefore, a display that is easily viewable for the viewer is made possible. Additionally, as another annotation change processing, the transmittance that is the attribute information of the annotation may be changed, not deleting the annotation. For example, the transmittance of the attribute information of the annotation 1108 entered in FIG. 11C changes to 95% as shown in FIG. 16B. Accordingly, after updating the display state in step S1306, the annotation 1108 is displayed in a transmitted state as shown in FIG. 12F, so that the display that is easily viewable for the viewer is made possible without interfering with the display of the object 1102.

Figure 11D:
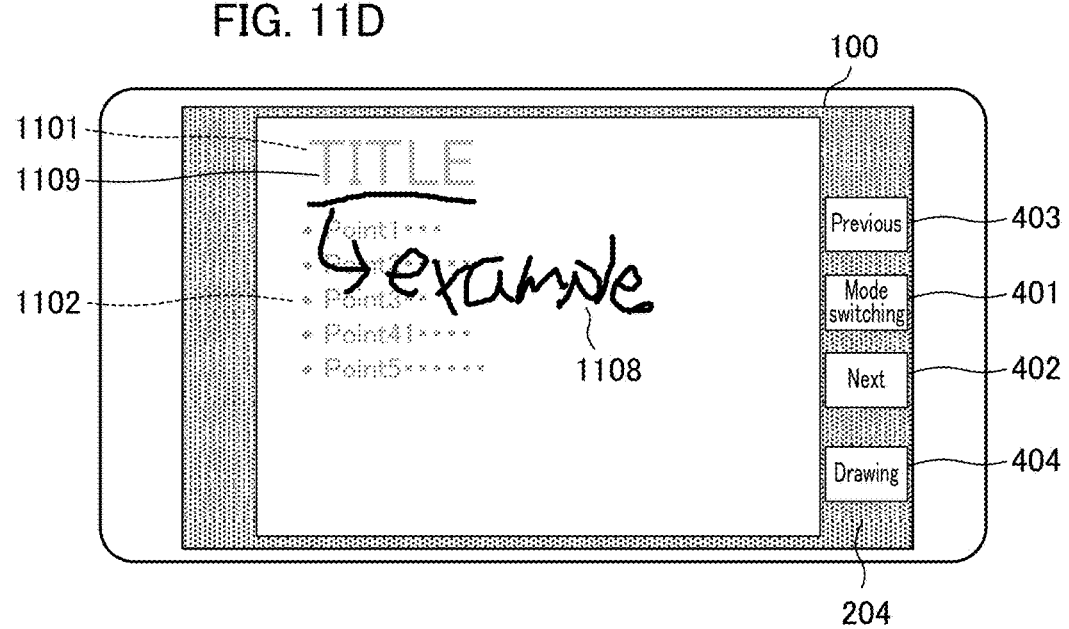

Note that, for comparison, a display example in the case where the annotation change processing in step S1305 was not performed is illustrated in FIG. 11D. As compared with the case where the annotation change processing was performed, this case shows that the object 1102 becomes difficult to be seen due to the annotation 1108. Note that, in the present embodiment, although the transmittance is changed to 95%, for example, it may be possible to make the object completely invisible by setting the transmittance to 100%, and the transmittance can be set to any value. In the case of changing the transmittance, the annotation is not deleted, so that the annotation can be left with the application image data. Therefore, the corresponding object ID is held as the attribute information, the annotation can be displayed in conjunction with the object of attention if the application image data will be displayed later, or if the previous button selection processing described below is performed. Additionally, in the present embodiment, although the transmittance of the annotation is changed, a display that is easily viewable may be performed by changing the line width, the color, or a layer, and the annotation change processing is not limited to the change of the transmittance.

Next, in step S1306, the display state of the touch UI 204 is updated based on the processing of the determined attention area and the annotation change processing. In contrast, in step S1302, a case where the next object could not been read (if the next selectable object is absent) indicates a state in which a final object in the page has already been read. Accordingly, in step S1303, it is determined that the display processing for all the objects has been finished, and the process proceeds to step S1307. Subsequently, in step S1307, the display order control unit 305 finishes the presentation display mode and hides the masks 1105 to 1109, and switches the mode to the page display mode.

Next, in step S1308, because the display mode is the page display mode, the syntax of the application image data stored in the RAM 211 is analyzed, and the next page and the object included therein are read. Next, in step S1309, the display order control unit 305 determines whether or not the next page could be read in step S1308. That is, it determines whether or not the page has been finished depending on the result indicating whether the next page could be read or not. If the next page could be read (NO), the process proceeds to step S1310. In contrast, if the final page of the application image data stored in the RAM 211 has been read and the next readable page is absent in S1308 (the next page cannot be read) (YES), the process proceeds to step S1311. Subsequently, in step S1311, the syntax of the application image data stored in the RAM 211 is analyzed, and the head page and the object included therein are read. Next, in step S1310, the display change event processing unit 304 controls the display magnification of the page 400 in accordance with the height of the touch UI 204, controls the start point of the page 400, and determines the display range of the page. Subsequently, in step S1306, the display state of the touch UI 204 is updated.

Figure 17:
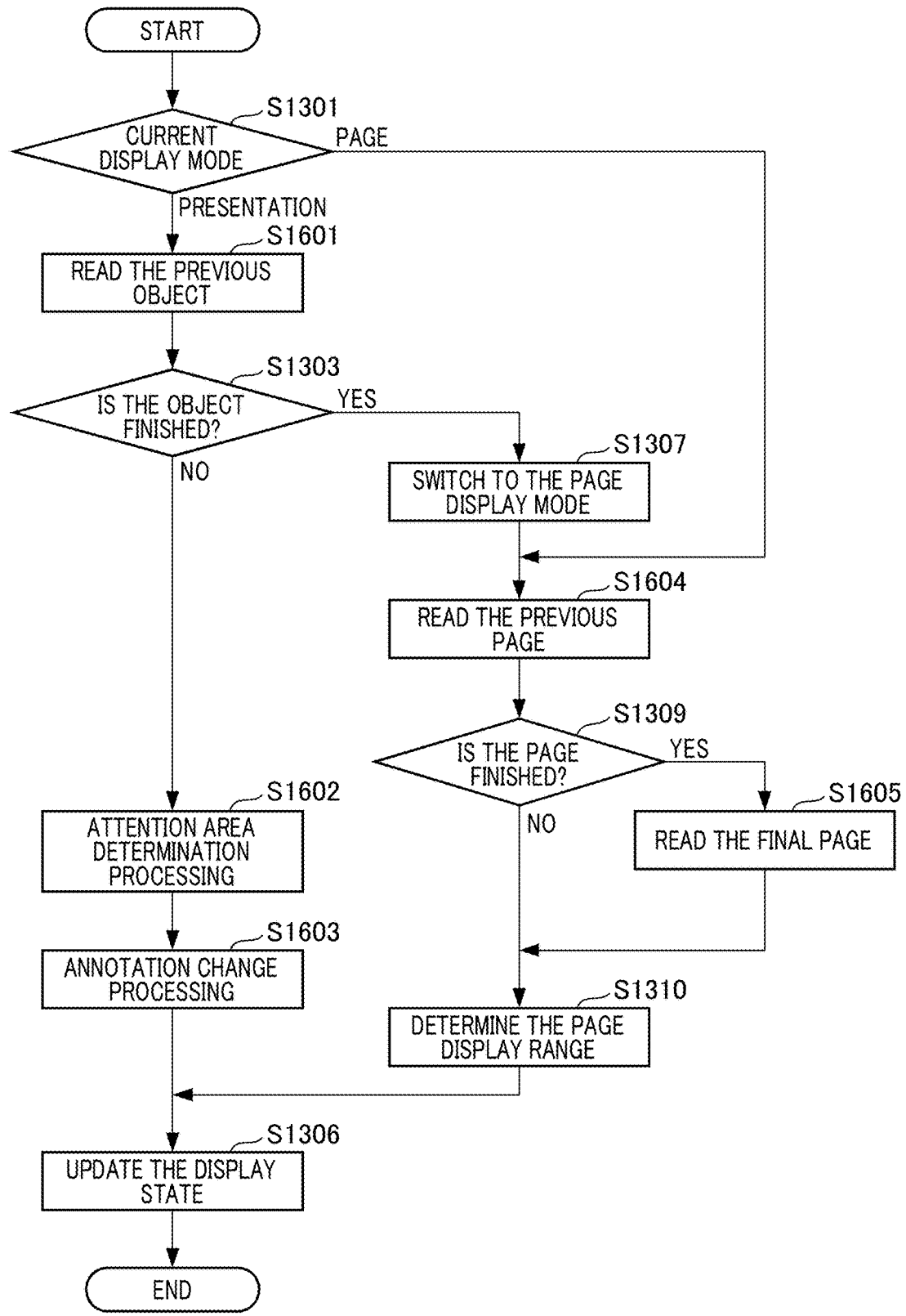
FIG. 17 is a flowchart illustrating previous selection processing.

Next, a description will be given of "previous selection processing (previous button selection processing)" executed if "previous button" 403 is tapped (specified) by the user, with reference to the flowchart illustrating the previous selection processing in FIG. 17. The previous selection processing performs the processes that are the same as step S1301, step S1303, step S1306, step S1307, step S1309, and S1310 in FIG. 17. Therefore, here, only steps S1601 to S1605, which are different from the process in FIG. 17, will be described.

First, in step S1301, if the current display mode is the presentation display mode, the process proceeds to step S1601. Subsequently, in step S1601, the display order control unit 305 selects the object to be next displayed based on the sentence structure tree from among all the objects in the page currently being read, and reads the object. In the present embodiment, the display order on the document tree structure if the previous button 403 is specified is the object on the lower layer that is the end in the document tree structure, and then the object in the lower layer that is a previous layer from the end of the object, that is, the order from the end of the lower layer. For example, in FIG. 8, the object to be first read is T7, which is the lower layer object at the end. If the "previous selection processing" is performed in a state where the object of T7 is being displayed on the touch UI 204 in the presentation display mode, the object of T6 is read due to the presence of T6 on the same layer. Additionally, if the "previous selection processing" is performed in a state where the object of T6 is being displayed, the object of T5 that is present at the end of the lower layer of the layer V1, which is present on the layer same as V2 that is the upper layer of T6, is read because another object on the layer same as T6 is absent. Note that also in the "previous selection processing", it may be possible that only the object having a drawing element is selected in a state similar to the "next selection processing", or only objects having a specific attribute are selected, or objects excluding only the specific attribute are selected. Additionally, it may be possible to select only an object that has a drawing element on the lower layer and does not have the drawing element as a single element, for example, H1 or V1.

Figure 12G:
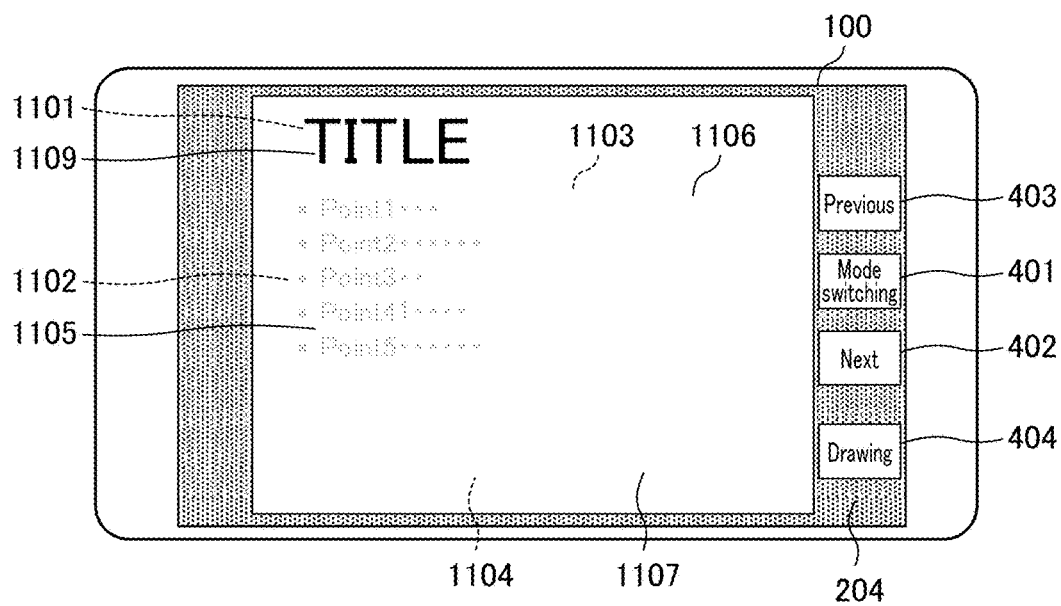

Next, if the next object could be read in step S1303 (if the selectable object is present: NO), the process proceeds to step S1602. Subsequently, in the attention area determination processing in step S1602, the previous object that was read in step S1601 serves as the area of attention, and the object in which the mask areas are displayed superimposed on the touch UI 204 is determined. For example, as an object that is previous to the object 1102 in FIG. 12E, the screen that is displayed if the object 1101 is selected as the object of the target of attention is shown in FIG. 12G. In the present embodiment, as shown in FIG. 12G, because the object 1102 has already been displayed as the object of the target of attention, the opaque mask 1105 is replaced by the semi-transparent mask that is semi-transparent white, and displayed superimposed on the page 400 in FIG. 11B. With this manner, the object 1101 that is currently the target of attention can be displayed in an easily viewable state while indicating the object that has already been displayed in the inconspicuous state. Note that the display state of FIG. 12G is represented as FIG. 15C.

Figure 12H:
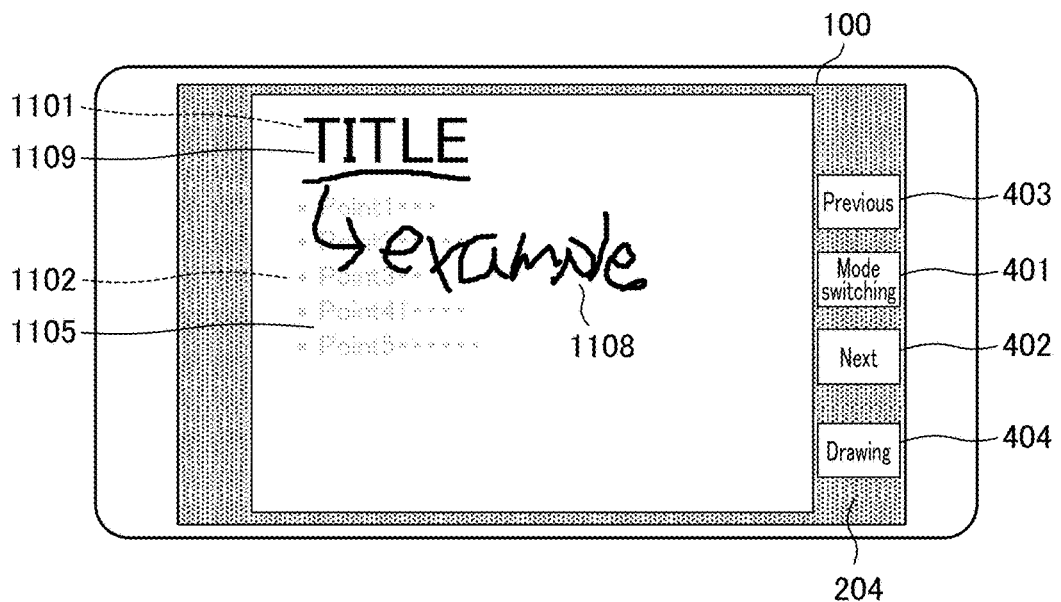

Next, in step S1603, the annotation change processing is performed. Simply explained, in the state same as in step S1305, the deletion of annotation is performed. Note that, in the case of holding the annotation, not deleting the annotation, the transmittance that is the attribute information of the annotation may be varied. For example, regarding the annotation 1108 having a transmittance of 95%, which is associated with the object 1101 in FIG. 12F, its transmittance is changed to 0% as shown in FIG. 12H. With this manner, if the previous object is selected by the previous selection processing, the associated annotation can be displayed in an easily viewable state again.

If the next object could not been read in step S1303 (if the selectable object is absent: YES), the process proceeds to step S1307, the mode is switched to the page display mode, and the process proceeds to step S1604. Subsequently, in step S1604, because the display mode is the page display mode, the syntax of the application image data stored in the RAM 211 is analyzed, and the previous page and the object included in it is read. Next, if the page that can be next read is absent (the next page cannot be read) in step S1309 (YES), the process proceeds to step S1605. Subsequently, in step S1605, the syntax of the application image data stored in the RAM 211 is analyzed, and the final page and the object included in it are read.

As described above, according to the present embodiment, if the objects are displayed in order, the annotation is displayed in conjunction with the display of the objects, and therefore the display that is easily viewable and suitable for the presentation while entering the annotation in the displayed document is allowed. Additionally, the entered annotation is associated with the object and stored with the document, so that if the document is reproduced later, the viewer can browse the document while displaying the annotation in a state similar to a situation in which the presenter explained the document while entering the annotation. Consequently, the viewer can browse the document as if the presenter is explaining it while entering the annotation in the presentation even if the viewer sees the document alone.

Second Embodiment

Figure 19A:
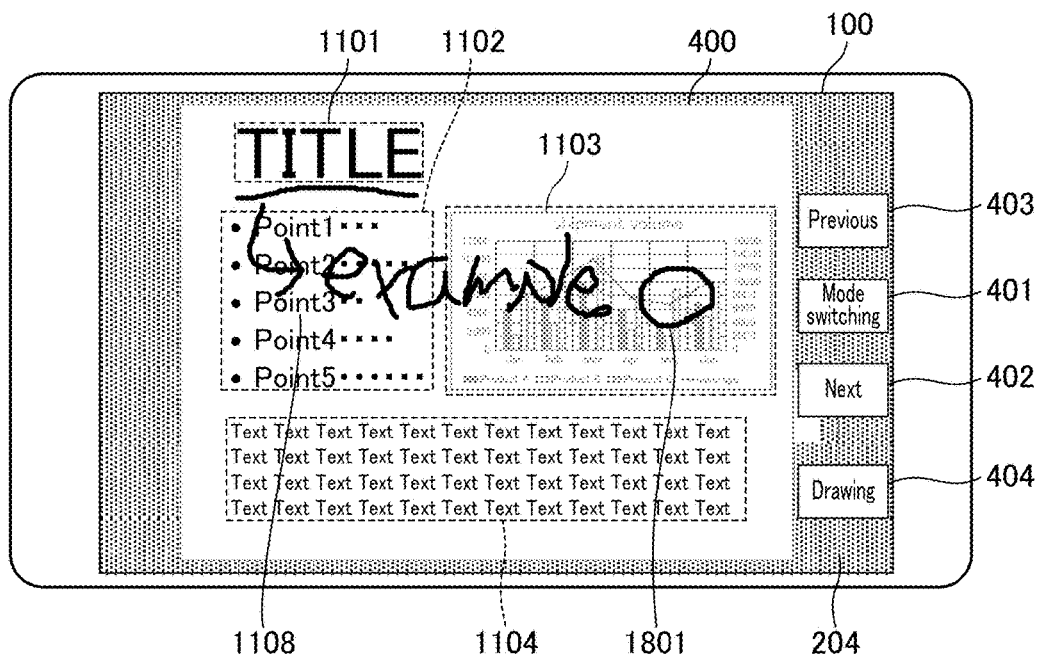
FIGS. 19A and 19B are diagrams illustrating an example of the display of the annotation on the touch UI during the enlarged display.
Figure 19B:
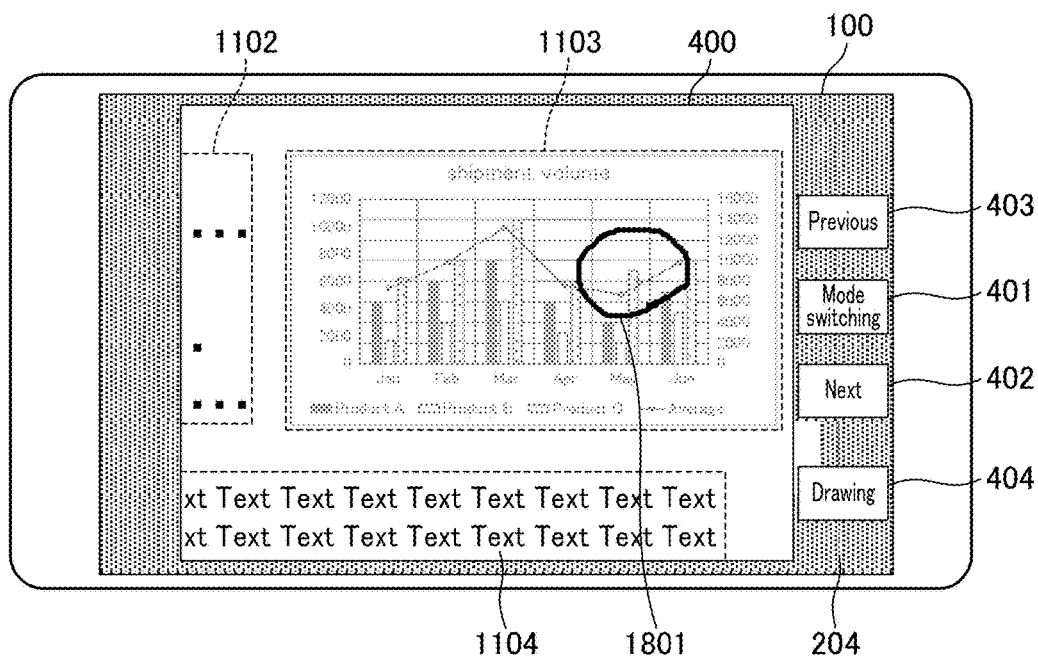

In the first embodiment, it was described in which the display of the annotation during the presentation display mode is changed in conjunction with the transition of the object of attention in the annotation display control unit 307. Consequently, only the annotation corresponding to the object that is currently receiving attention is displayed with highlights, and the object and the annotation to which the viewer needs to pay attention could be displayed in the easily viewable state. On the other hand, the presenter sometimes wants to perform the enlarged display of the page 400 by the pinch-out operation, without using the next button 402 and previous button 403. For example, the presenter can enlarge the screen as shown in FIG. 19B by the pinch-out operation. In this case, because the next button 402 and previous button 403 were not used, the attention area control unit 306 was not able to identify the attention area.

Figure 18:
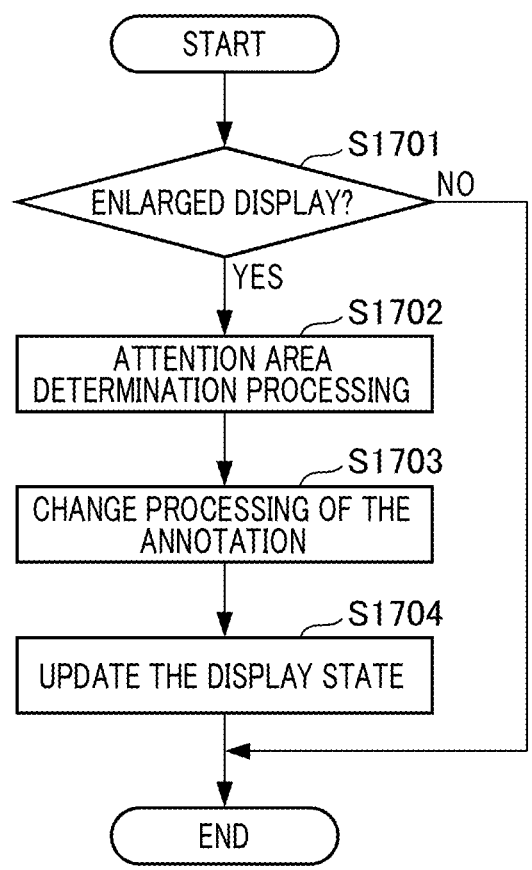
FIG. 18 is a flowchart illustrating change processing of the annotation during the enlarged display.

In contrast, in the second embodiment, a process in which the area of attention is defined and the display control of the annotation is performed in the case where the presenter enlarges the page 400 by the pinch-out operation will be described. Hereinafter, a description will be given by focusing on differences with the first embodiment with reference to FIG. 18 and FIGS. 19A and 19B. FIG. 18 is a flowchart illustrating the annotation change processing during the enlarged display. FIGS. 19A and 19B are diagrams illustrating an example of the screen of the annotation in the case of the enlarged display.

First, in step S1701, the gesture event processing unit 302 determines whether or not the page 400 is enlarged by a pinch-out event. If the page has been enlarged by the pinch-out event (YES), the process proceeds to step S1702, and if the page has not been enlarged (NO), the process ends. Next, in step S1702, the attention area control unit 306 performs attention area determination processing that determines the object that is contained within the screen during the enlarged display of the page 400. For example, in FIG. 19A, the entire page 400 is displayed, and the dashed lines 1101 to 1104 show the objects. However, the dashed lines are displayed for clearly showing the object, and they are not displayed on the actual page 400. Additionally, the entered annotations are annotations 1108 and 1801, wherein the annotation 1108 is associated with the object 1101, and the annotation 1801 is associated with the object 1103. At this time, the page 400 that has been enlarged by the user is shown in FIG. 19B and the object area that is displayed during the enlargement are determined to be the area of attention because of the display area of the page 400 and the display area of the object during the enlargement display.

Specifically, the objects 1102 to 1104 shown by the broken lines in FIG. 19B serve as the areas of attention during the enlarged display.

Next, in step S1703, the annotation display control unit 307 changes the display of the annotation so as to display only the annotation associated with the area that was determined to be the area of attention in step S1702. For example, in FIG. 19B, because the objects 1102 to 1104 become the areas of attention, only the annotation 1801 associated with the object 1103 is displayed, the transmittance of the annotation 1108 is set to 100%, and it is displayed so that the viewer cannot see it. Subsequently, in step S1704, based on the processing of the determined attention area and the change processing of the annotation, the display state of the touch UI 204 is updated.

As described above, according to the present embodiment, in addition to the configuration of the first embodiment, the attention area during the enlargement/reduction of the page is specified, only the annotation corresponding to the object of the (displayed) area of attention is displayed, and the display state is changed so as not to display the annotation that does not correspond. Therefore, the presenter can effectively show the document without distracting viewers.

Third Embodiment

In the first embodiment and the second embodiment, the description was given of the present embodiments in which the display of the annotation is changed in conjunction with the area of the object to be displayed with attention (area of attention). Thereby, only the annotation corresponding to the object that is currently receiving the attention is displayed with highlights, so that the object and annotation to which attention is paid can be displayed to the user in the easily viewable state.

In contrast, in the third embodiment, in an application in which the object is automatically animation-displayed in the order specified by the user in advance, a description will be given of processing of performing the display control of the annotation in conjunction with the state transition of the animation display. Here, the animation display indicates that the objects are displayed in accordance with the order and the operation that are specified by the user in advance. Hereinafter, with reference to FIGS. 20 to 22, a description will be given focusing on differences with the first embodiment.

Figure 20:
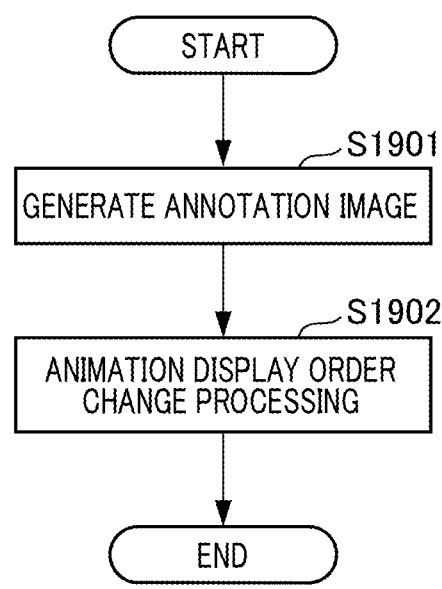
FIG. 20 is a flowchart illustrating annotation change processing.
Figure 22A:
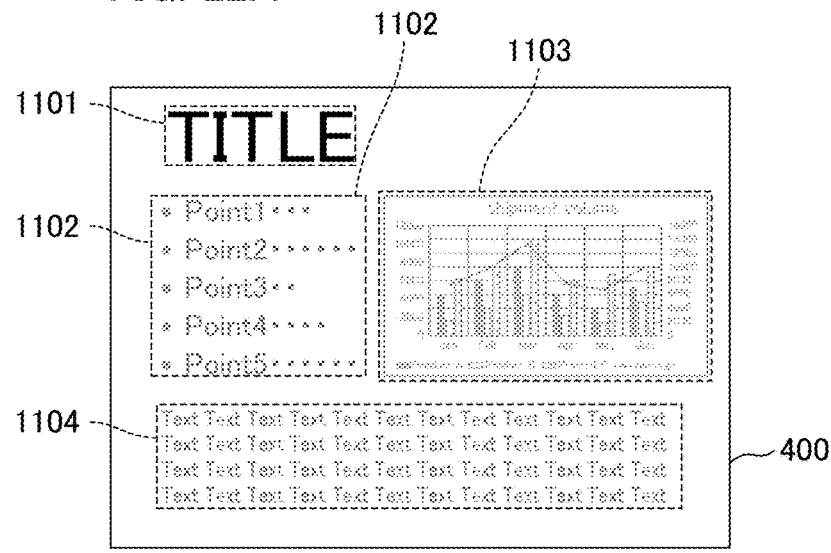
FIGS. 22A and 22B are diagrams illustrating an example of the display of the annotation on the touch UI.
Figure 22B:
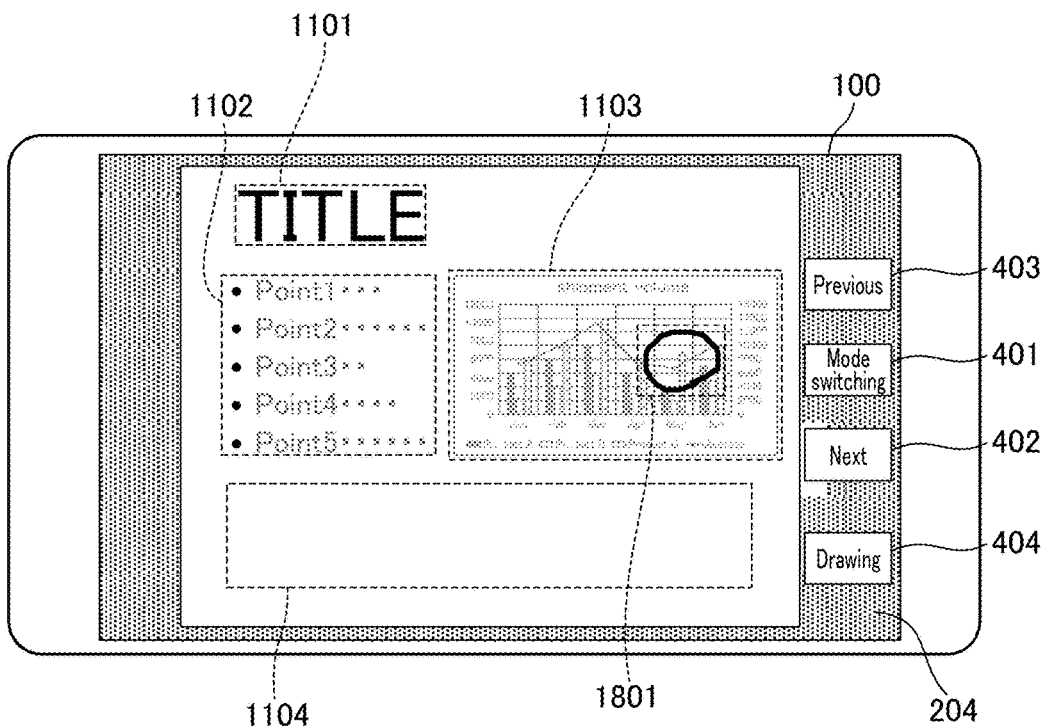

FIG. 20 is a flow chart that associates the annotations with the state transition indicating the display order of the animation. FIGS. 21A and 21B illustrate the display order in a case where the object and the annotation shown in FIGS. 22A and 22B are animation-displayed in order. Because the operation of the animation is not directly related to the present embodiment, the detailed description will be omitted. FIGS. 22A and 22B are diagrams illustrating a display example of the object and the annotation. Note that the order display of the animation can be changed by the next button 402 and the previous button 403. Specifically, if the object 1102 having display order 02 (object ID: 02) in FIG. 22A is displayed, the next button 402 is tapped, and the animation-display of the object 1103 having display order 03 (object ID: 03) is performed.

Here, with reference to FIG. 20, first, the annotation image is generated in step S1901. Since the generation of the annotation image has same processes as steps S1203 shown in FIG. 13, and the detailed description will be omitted. In order to simplify the description, a case is assumed in which the drawing button 404 is tapped by the user if the object 1103 having display order 03 (object ID: 03) in FIG. 21A is being displayed, and the annotation is entered.

Next, in step S1902, the display order of the animation is changed. Specifically, as shown in FIG. 21B, the object 1104 having display order 04 (object ID: 04) in FIG. 21A is changed to the animation display of the annotation 1801 (annotation ID: 01). Subsequently, the display order 04 that was originally present in FIG. 21A is changed to display order 05. Consequently, the animation display of the annotation 1801 (annotation ID: 01) can be performed between the animation display of the object 1103 (object ID: 03) and the object 1104 (object ID: 04).

Specifically, the animation display of the annotation is added to the original animation so that the reproduction in a state similar to the case if the presentation was performed while entering the annotation, even if reproducing the application later is allowed. Note that the animation display operation of the annotation is performed such that the annotation image is displayed by pop-up, but the present invention is not limited to this, and other operations may be used if the operation enables newly displaying the annotation. Additionally, the annotation 1801 having display order 04 (annotation ID: 01) in FIG. 21B is displayed by changing its transmittance if the display is switched to the animation of the following order.

As described above, according to the present embodiment, in addition to the configurations of the first embodiment and the second embodiment, the display of the annotation is added to the display order of the animation. Consequently, the user can display the annotation image entered by the presenter in conjunction with the original animation.

OTHER EMBODIMENTS

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions This application claims the benefit of Japanese Patent Application No. 2014-161697, filed Aug. 7, 2014, which is hereby incorporated by reference wherein in its entirety.

What is claimed is:

1. An image display apparatus that displays image data including a plurality of objects, the image display apparatus comprising:
 a display unit configured to focus-display an object from among the plurality of objects;
 an input unit configured to input annotation to the object; and
 a change unit configured to change a display of the annotation depending on the focus-displayed object if an object different from the object corresponding to the annotation that has been input by the input unit is focus-displayed,
 wherein the change unit changes the display of the annotation by lowering the transmittance of the annotation corresponding to the object being displayed and increasing the transmittance of the annotation corresponding to the object different from the object being displayed.

2. The image display apparatus according to claim 1, wherein if a user selects an object from among the plurality of objects and the display unit focus-displays the object, the change unit changes the display so as to display only the annotation corresponding to the selected object.

3. The image display apparatus according to claim 1, further comprising:
 a specifying unit configured to specify an order for displaying the object from among the plurality of objects,
 wherein, in a case where the display unit focus-displays each of the plurality of objects in order in a forward direction or a backward direction in accordance with the specified order, the change unit changes the display of the annotation corresponding to the object being displayed if the next object that is different from the object being displayed is focus-displayed.

4. The image display apparatus according to claim 3, wherein the specifying unit further specifies the order including the input annotation, and
 wherein if the display unit automatically performs the focus-display in order in accordance with the specified order, the change unit changes the display of the annotation depending on the order including the annotation.

5. The image display apparatus according to claim 3, wherein the specifying unit specifies the order depending on a respective position of each of the objects in the image data.

6. A method for controlling an image display apparatus that displays image data including a plurality of objects, the method comprising:
 focus-displaying an object from among the plurality of objects;
 inputting annotation to the object; and
 changing a display of the annotation depending on the focus-displayed object if an object different from the object corresponding to the annotation that has been input in the inputting is focus-displayed,
 wherein the display of the annotation is changed by lowering the transmittance of the annotation corresponding to the object being displayed and increasing the transmittance of the annotation corresponding to the object different from the object being displayed.

7. A non-transitory storage medium storing a readable program for causing a computer to execute a control method of an image display apparatus that displays image data including a plurality of objects, the control method comprising:
 focus-displaying an object from among the plurality of objects;
 inputting annotation to the object; and
 changing a display of the annotation depending on the focus-displayed object if an object different from the object corresponding to the annotation that has been input in the inputting is focus-displayed,
 wherein the display of the annotation is changed by lowering the transmittance of the annotation corresponding to the object being displayed and increasing the transmittance of the annotation corresponding to the object different from the object being displayed.

* * * * *